United States Patent
Parker et al.

(10) Patent No.: US 11,608,997 B1
(45) Date of Patent: Mar. 21, 2023

(54) DUAL-WHEEL HVAC SYSTEM AND METHOD HAVING IMPROVED DEW POINT CONTROL

(71) Applicant: NovelAire Technologies, L.L.C., Baton Rouge, LA (US)

(72) Inventors: Terry Parker, Baton Rouge, LA (US); David McDonald, Baton Rouge, LA (US); Nicholas Ysidron, Baton Rouge, LA (US); Robert Mills, Baton Rouge, LA (US); David Wintemute, Trois-Rivières (CA)

(73) Assignee: NovelAire Technologies, L.L.C., Baton Rouge, LA (US)

(*) Notice: Subject to any disclaimer, the term of this patent is extended or adjusted under 35 U.S.C. 154(b) by 0 days.

(21) Appl. No.: 17/581,099

(22) Filed: Jan. 21, 2022

Related U.S. Application Data

(63) Continuation-in-part of application No. 16/881,308, filed on May 22, 2020, now Pat. No. 11,333,371.

(60) Provisional application No. 62/877,529, filed on Jul. 23, 2019.

(51) Int. Cl.
| | |
|---|---|
| *F24F 3/147* | (2006.01) |
| *F24F 3/153* | (2006.01) |
| *F24F 12/00* | (2006.01) |
| *F28D 19/04* | (2006.01) |
| *F24F 3/14* | (2006.01) |

(52) U.S. Cl.
CPC ...... *F24F 3/1423* (2013.01); *F24F 2203/104* (2013.01); *F24F 2203/1016* (2013.01); *F24F 2203/1032* (2013.01); *F24F 2203/1084* (2013.01)

(58) Field of Classification Search
CPC ........ F24F 12/00; F24F 12/003; F24F 12/001; F24F 3/147; F24F 3/153; F24F 2203/1032; F28D 19/041; Y02B 30/56; Y02B 30/52
See application file for complete search history.

(56) References Cited

U.S. PATENT DOCUMENTS

| | | |
|---|---|---|
| 5,401,706 A | 3/1995 | Fischer |
| 5,496,397 A | 3/1996 | Fischer et al. |
| 5,649,428 A | 7/1997 | Calton et al. |
| 6,199,388 B1 | 3/2001 | Fischer, Jr. |
| 10,690,358 B2 | 6/2020 | Fischer |
| 2015/0135755 A1 | 5/2015 | Rich et al. |
| 2017/0356661 A1 | 12/2017 | Fischer |

OTHER PUBLICATIONS

SEMCO Incorporated, Desiccant Wheel Products, Pinnacle™ Primary Ventilation System, Technical Guide, 1999-2001, 31 pages.

(Continued)

*Primary Examiner* — Lionel Nouketcha
(74) *Attorney, Agent, or Firm* — Jones Walker LLP

(57) ABSTRACT

A dedicated outdoor air system and method that is capable of operating over a broader spectrum of conditions. The HVAC system of the present invention utilizes a heating means positioned within the return air passageway in order to optimize the regeneration of the desiccant wheel and energy recovery device. By positioning a heating means upstream of the regeneration side of the desiccant wheel, the system is capable of providing supply air having low dew points to the enclosed space while still providing improved energy efficiency over conventional HVAC systems.

13 Claims, 17 Drawing Sheets

(56) References Cited

OTHER PUBLICATIONS

Flakt Group, SEMCO, Pinnacle Series, Dedicated Outdoor Air System, Pinnacle® Primary Ventilation System, 2018, 12 pages.
Flakt Group, SEMCO, Pinnacle® Primary Ventilation System, 2018, 2 pages.
Flakt Group, SEMCO, Pinnacle® Series, Dedicated Outdoor Air System Sales Brochure, 2020, 9 pages.
Flakt Group, SEMCO, Pinnacle® II System, Dedicated Outdoor Air System Technical Guide, 2020, 19 pages.

| Unit Operation | | | | | | | | | | |
|---|---|---|---|---|---|---|---|---|---|---|
| Point | Flowrate (cfm) | Dry Bulb Temp. (°F) | Wet Bulb Temp. (°F) | Rel. Humidity (%) | Specific Volume (ft³/lb) | Enthalpy (Btu/lb) | Dew Point (°F) | Density (lb/ft³) | Vapor Pressure (in. HG) | Absolute Humidity (gr/lb) |
| A | 10000 | 95.0 | 77.9 | 47.1 | 14.35 | 41.32 | 71.7 | 0.0709 | 0.783 | 117.6 |
| B | 10000 | 70.7 | 64.4 | 71.8 | 13.61 | 29.59 | 61.1 | 0.0743 | 0.544 | 81.2 |
| C | 10000 | 51.4 | 51.4 | 100.0 | 13.05 | 21.08 | 51.4 | 0.0773 | 0.382 | 56.7 |
| D | 10000 | 60.6 | 51.9 | 55.5 | 13.24 | 21.34 | 44.6 | 0.0760 | 0.296 | 43.4 |
| E | 10000 | 60.6 | 51.9 | 55.5 | 13.24 | 21.34 | 44.6 | 0.0760 | 0.296 | 43.4 |
| F | 10000 | 68.0 | 55.3 | 44.2 | 13.44 | 23.34 | 45.4 | 0.0749 | 0.305 | 44.8 |
| G | 10000 | 68.0 | 55.3 | 44.2 | 13.44 | 23.34 | 45.4 | 0.0749 | 0.305 | 44.8 |
| H | 10000 | 58.5 | 54.7 | 79.1 | 13.23 | 23.03 | 52.0 | 0.0762 | 0.391 | 58.1 |
| I | 10000 | 58.5 | 54.7 | 79.0 | 13.23 | 23.02 | 52.0 | 0.0762 | 0.391 | 58.1 |
| J | 10000 | 83.2 | 66.6 | 41.8 | 13.90 | 31.14 | 57.6 | 0.0727 | 0.480 | 71.4 |

| Unit Operation | | | | | | | | | | |
|---|---|---|---|---|---|---|---|---|---|---|
| Point | Flowrate (cfm) | Dry Bulb Temp. (°F) | Wet Bulb Temp. (°F) | Rel. Humidity (%) | Specific Volume (ft³/lb) | Enthalpy (Btu/lb) | Dew Point (°F) | Density (lb/ft³) | Vapor Pressure (in. HG) | Absolute Humidity (gr/lb) |
| A | 10000 | 95.0 | 77.9 | 47.1 | 14.35 | 41.32 | 71.7 | 0.0709 | 0.783 | 117.6 |
| B | 10000 | 75.3 | 66.7 | 64.4 | 13.74 | 31.35 | 62.5 | 0.0737 | 0.570 | 84.7 |
| C | 10000 | 51.4 | 51.4 | 100.0 | 13.05 | 21.08 | 51.4 | 0.0773 | 0.382 | 56.7 |
| D | 10000 | 65.6 | 52.4 | 40.4 | 13.35 | 21.63 | 40.9 | 0.0753 | 0.257 | 37.8 |
| E | 10000 | 65.6 | 52.4 | 40.4 | 13.35 | 21.63 | 40.9 | 0.0753 | 0.257 | 37.8 |
| F | 10000 | 68.0 | 55.3 | 44.2 | 13.44 | 23.34 | 45.4 | 0.0749 | 0.305 | 44.8 |
| G | 10000 | 80.0 | 59.9 | 29.5 | 13.74 | 26.25 | 45.4 | 0.0732 | 0.305 | 44.8 |
| H | 10000 | 65.4 | 58.8 | 68.0 | 13.43 | 25.61 | 54.6 | 0.0752 | 0.429 | 63.7 |
| I | 10000 | 65.4 | 58.9 | 68.4 | 13.43 | 25.66 | 54.7 | 0.0752 | 0.432 | 63.7 |
| J | 10000 | 85.5 | 72.2 | 53.0 | 14.05 | 35.87 | 66.5 | 0.0722 | 0.655 | 98.0 |

| Unit Operation – 80°F | | | | | | | | | | |
|---|---|---|---|---|---|---|---|---|---|---|
| Point | Flowrate (cfm) | Dry Bulb Temp. (°F) | Wet Bulb Temp. (°F) | Rel. Humidity (%) | Specific Volume (ft³/lb) | Enthalpy (Btu/lb) | Dew Point (°F) | Density (lb/ft³) | Vapor Pressure (in. HG) | Absolute Humidity (gr/lb) |
| A | 10000 | 80.0 | 68.0 | 54.6 | 13.86 | 32.36 | 62.2 | 0.0730 | 0.564 | 84.0 |
| B | 10000 | 70.2 | 62.3 | 64.8 | 13.57 | 28.03 | 57.8 | 0.0744 | 0.483 | 71.4 |
| C | 10000 | 51.4 | 51.4 | 100.0 | 13.05 | 21.08 | 51.4 | 0.0773 | 0.382 | 56.7 |
| D | 10000 | 65.6 | 52.4 | 40.4 | 13.35 | 21.63 | 40.9 | 0.0753 | 0.257 | 37.8 |
| E | 10000 | 65.6 | 52.4 | 40.4 | 13.35 | 21.63 | 40.9 | 0.0753 | 0.257 | 37.8 |
| F | 10000 | 68.0 | 55.3 | 44.2 | 13.44 | 23.34 | 45.4 | 0.0749 | 0.305 | 44.8 |
| G | 10000 | 80.0 | 59.9 | 29.5 | 13.74 | 26.25 | 45.4 | 0.0732 | 0.305 | 44.8 |
| H | 10000 | 65.4 | 58.8 | 68.0 | 13.43 | 25.61 | 54.6 | 0.0752 | 0.429 | 63.7 |
| I | 10000 | 65.4 | 58.9 | 68.4 | 13.43 | 25.66 | 54.7 | 0.0752 | 0.432 | 63.7 |
| J | 10000 | 76.5 | 65.7 | 56.6 | 13.75 | 30.48 | 60.0 | 0.0735 | 0.521 | 77.7 |

| Unit Operation – 60°F | | | | | | | | | |
|---|---|---|---|---|---|---|---|---|---|
| Point | Flowrate (cfm) | Dry Bulb Temp. (°F) | Wet Bulb Temp. (°F) | Rel. Humidity (%) | Specific Volume (ft³/lb) | Enthalpy (Btu/lb) | Dew Point (°F) | Density (lb/ft³) | Vapor Pressure (in. HG) | Absolute Humidity (gr/lb) |
| A | 10000 | 60.0 | 54.6 | 71.3 | 13.26 | 22.95 | 50.7 | 0.0760 | 0.372 | 55.3 |
| B | 10000 | 60.0 | 54.6 | 71.3 | 13.26 | 22.95 | 50.7 | 0.0760 | 0.372 | 55.3 |
| C | 10000 | 51.4 | 51.0 | 97.3 | 13.04 | 20.85 | 50.7 | 0.0773 | 0.372 | 55.3 |
| D | 10000 | 65.8 | 52.5 | 40.0 | 13.36 | 21.66 | 40.8 | 0.0753 | 0.256 | 37.8 |
| E | 10000 | 65.8 | 52.5 | 40.0 | 13.36 | 21.66 | 40.8 | 0.0753 | 0.256 | 37.8 |
| F | 10000 | 68.0 | 55.3 | 44.2 | 13.44 | 23.34 | 45.4 | 0.0749 | 0.305 | 44.8 |
| G | 10000 | 80.0 | 59.9 | 29.5 | 13.74 | 26.25 | 45.4 | 0.0732 | 0.305 | 44.8 |
| H | 10000 | 65.6 | 59.0 | 68.1 | 13.43 | 25.74 | 54.8 | 0.0751 | 0.433 | 64.4 |
| I | 10000 | 65.6 | 59.0 | 68.1 | 13.43 | 25.74 | 54.8 | 0.0751 | 0.433 | 64.4 |
| J | 10000 | 67.6 | 59.7 | 63.6 | 13.48 | 26.23 | 54.8 | 0.0749 | 0.433 | 64.4 |

| Unit Operation – 95°F | | | | | | | | | |
|---|---|---|---|---|---|---|---|---|---|
| Point | Flowrate (cfm) | Dry Bulb Temp. (°F) | Wet Bulb Temp. (°F) | Rel. Humidity (%) | Specific Volume (ft³/lb) | Enthalpy (Btu/lb) | Dew Point (°F) | Density (lb/ft³) | Vapor Pressure (in. HG) | Absolute Humidity (gr/lb) |
| A | 10000 | 95.0 | 77.9 | 47.1 | 14.35 | 41.32 | 71.7 | 0.0709 | 0.783 | 117.6 |
| B | 10000 | 73.0 | 65.3 | 66.7 | 13.67 | 30.22 | 61.3 | 0.0740 | 0.546 | 81.2 |
| C | 10000 | 52.4 | 52.2 | 98.7 | 13.08 | 21.55 | 52.1 | 0.0771 | 0.391 | 58.1 |
| D | 10000 | 67.2 | 53.1 | 38.3 | 13.39 | 22.03 | 41.0 | 0.0751 | 0.257 | 37.8 |
| E | 10000 | 67.2 | 53.1 | 38.3 | 13.39 | 22.03 | 41.0 | 0.0751 | 0.257 | 37.8 |
| F | 10000 | 68.0 | 55.3 | 44.2 | 13.44 | 23.34 | 45.4 | 0.0749 | 0.305 | 44.8 |
| G | 2500 | 110.0 | 69.8 | 11.7 | 14.50 | 33.53 | 45.4 | 0.0694 | 0.305 | 44.8 |
| H | 2500 | 75.4 | 67.7 | 67.7 | 13.76 | 32.11 | 64.0 | 0.0736 | 0.601 | 89.6 |
| I | 7500 | 59.8 | 54.8 | 73.4 | 13.26 | 23.10 | 51.3 | 0.0760 | 0.380 | 56.0 |
| J | 7500 | 89.0 | 74.3 | 50.8 | 14.16 | 37.84 | 68.4 | 0.0717 | 0.700 | 105.0 |

| Unit Operation – 80°F | | | | | | | | | |
|---|---|---|---|---|---|---|---|---|---|
| Point | Flowrate (cfm) | Dry Bulb Temp. (°F) | Wet Bulb Temp. (°F) | Rel. Humidity (%) | Specific Volume (ft³/lb) | Enthalpy (Btu/lb) | Dew Point (°F) | Density (lb/ft³) | Vapor Pressure (in. HG) | Absolute Humidity (gr/lb) |
| A | 10000 | 80.0 | 68.0 | 54.6 | 13.86 | 32.36 | 62.2 | 0.0730 | 0.564 | 84.0 |
| B | 10000 | 67.3 | 60.4 | 67.5 | 13.49 | 26.67 | 56.2 | 0.0749 | 0.455 | 67.2 |
| C | 10000 | 52.4 | 52.2 | 98.7 | 13.08 | 21.55 | 52.1 | 0.0771 | 0.391 | 58.1 |
| D | 10000 | 67.2 | 53.1 | 38.3 | 13.39 | 22.03 | 41.0 | 0.0751 | 0.257 | 37.8 |
| E | 10000 | 67.2 | 53.1 | 38.3 | 13.39 | 22.03 | 41.0 | 0.0751 | 0.257 | 37.8 |
| F | 10000 | 68.0 | 55.3 | 44.2 | 13.44 | 23.34 | 45.4 | 0.0749 | 0.305 | 44.8 |
| G | 2500 | 110.0 | 69.8 | 11.7 | 14.50 | 33.53 | 45.4 | 0.0694 | 0.305 | 44.8 |
| H | 2500 | 75.4 | 67.7 | 67.7 | 13.76 | 32.11 | 64.0 | 0.0736 | 0.601 | 89.6 |
| I | 7500 | 59.8 | 54.8 | 73.4 | 13.26 | 23.10 | 51.3 | 0.0760 | 0.380 | 56.0 |
| J | 7500 | 76.6 | 65.9 | 57.1 | 13.76 | 30.65 | 60.3 | 0.0735 | 0.527 | 78.4 |

| Unit Operation – 60°F | | | | | | | | | |
|---|---|---|---|---|---|---|---|---|---|
| Point | Flowrate (cfm) | Dry Bulb Temp. (°F) | Wet Bulb Temp. (°F) | Rel. Humidity (%) | Specific Volume (ft³/lb) | Enthalpy (Btu/lb) | Dew Point (°F) | Density (lb/ft³) | Vapor Pressure (in. HG) | Absolute Humidity (gr/lb) |
| A | 10000 | 60.0 | 54.6 | 71.2 | 13.26 | 22.95 | 50.7 | 0.0760 | 0.372 | 55.3 |
| B | 10000 | 60.0 | 54.6 | 71.2 | 13.26 | 22.95 | 50.7 | 0.0760 | 0.372 | 55.3 |
| C | 10000 | 52.4 | 51.4 | 93.7 | 13.07 | 21.08 | 50.6 | 0.0771 | 0.371 | 54.6 |
| D | 10000 | 66.5 | 52.4 | 37.4 | 13.37 | 21.58 | 39.7 | 0.0752 | 0.245 | 36.4 |
| E | 10000 | 66.5 | 52.4 | 37.4 | 13.37 | 21.58 | 39.7 | 0.0752 | 0.245 | 36.4 |
| F | 10000 | 68.0 | 55.3 | 44.2 | 13.44 | 23.34 | 45.4 | 0.0749 | 0.305 | 44.8 |
| G | 2500 | 110.0 | 69.8 | 11.7 | 14.50 | 33.53 | 45.4 | 0.0694 | 0.305 | 44.8 |
| H | 2500 | 76.0 | 67.6 | 65.5 | 13.77 | 32.06 | 63.6 | 0.0735 | 0.593 | 88.2 |
| I | 7500 | 60.3 | 54.9 | 71.4 | 13.27 | 23.13 | 51.0 | 0.0760 | 0.377 | 56.0 |
| J | 7500 | 61.8 | 55.3 | 66.9 | 13.31 | 23.40 | 50.7 | 0.0757 | 0.372 | 55.3 |

| Unit Operation | | | | | | | | | | | |
|---|---|---|---|---|---|---|---|---|---|---|---|
| Point | Flowrate (cfm) | Dry Bulb Temp. (°F) | Wet Bulb Temp. (°F) | Rel. Humidity (%) | Humidity Ratio (gr/lb) | Specific Volume (ft³/lb) | Enthalpy (Btu/lb) | Dew Point (°F) | Density (lb/ft³) | Vapor Pressure (in. HG) | Absolute Humidity (gr/cu.ft.) |
| A | 10000 | 95.0 | 78.0 | 47.3 | 118.0 | 14.37 | 41.40 | 71.8 | 0.0708 | 0.786 | 8.219 |
| B | 10000 | 74.0 | 66.5 | 68.0 | 85.8 | 13.71 | 31.16 | 62.8 | 0.0738 | 0.576 | 6.253 |
| C | 10000 | 52.4 | 52.2 | 99.0 | 58.1 | 13.08 | 21.57 | 52.1 | 0.0771 | 0.392 | 4.441 |
| D | 10000 | 64.9 | 53.0 | 45.0 | 41.2 | 13.35 | 21.99 | 43.1 | 0.0754 | 0.279 | 3.087 |
| E | 10000 | 64.9 | 53.0 | 45.0 | 41.2 | 13.35 | 21.99 | 43.1 | 0.0754 | 0.279 | 3.087 |
| F | 10000 | 70.0 | 58.0 | 48.3 | 52.9 | 13.51 | 25.05 | 49.6 | 0.0746 | 0.358 | 3.914 |
| G | 2500 | 100.0 | 68.3 | 18.5 | 52.9 | 14.28 | 32.35 | 49.6 | 0.0706 | 0.358 | 3.704 |
| H | 2500 | 73.4 | 66.7 | 71.0 | 87.8 | 13.70 | 31.33 | 63.4 | 0.0739 | 0.589 | 6.407 |
| I | 7500 | 62.1 | 57.6 | 76.6 | 63.8 | 13.34 | 24.83 | 54.7 | 0.0756 | 0.430 | 4.782 |
| J | 10000 | 64.9 | 60.0 | 75.7 | 69.8 | 13.43 | 26.45 | 57.1 | 0.0752 | 0.470 | 5.196 |

DUAL-WHEEL HVAC SYSTEM AND METHOD HAVING IMPROVED DEW POINT CONTROL

CROSS-REFERENCE TO RELATED APPLICATIONS

This application is a continuation-in-part of U.S. application Ser. No. 16/881,308 filed May 22, 2020, which claims the benefit of U.S. Provisional Application No. U.S. 62/877,529, filed Jul. 23, 2019. Both of the foregoing applications are hereby incorporated by reference herein in their entireties.

BACKGROUND

Hospitals and other large buildings oftentimes use dedicated outdoor air systems (DOAS). Dedicated outdoor air systems are HVAC systems that can condition 100 percent outdoor air, thereby improving indoor air quality while also controlling relative humidity. A DOAS can also reduce the load on other HVAC equipment in a building.

By recovering energy from the exhaust air using one or more energy recovery devices, conventional DOAS units have been shown to be effective at reducing the ventilation energy penalty associated with the introduction of high quantities of outdoor air into the indoor space. For example, U.S. Pat. No. 6,199,388 to Fischer teaches a HVAC system that utilizes an energy recovery wheel and a dehumidification wheel placed in a series circuit arrangement with a cooling means positioned in-between to control the temperature and humidity of air supplied to a controlled space. A schematic of a typical prior art Fischer system is depicted in FIG. 1A. The cooling coil is typically either chilled water or a direct expansion (DX) coil. In cooling mode, the energy recovery wheel 110—which is designed to exchange both sensible and latent energy—functions to cool and dehumidify the supply air 101 as it passes through the supply side of the wheel. The supply air 101 is further cooled and dehumidified by passing it across the cooling coil 130. The supply air 101 is then warmed and further dehumidified by passing it through the desiccant wheel 120, which is designed for maximum exchange of latent energy; i.e., humidity. Meanwhile, the desiccant wheel 120 is warmed and dehumidified (i.e., regenerated) by passing exhaust air 102 through its regeneration side. The cooled exhaust air 102 then passes through the energy recovery wheel 110, cooling and dehumidifying the energy recovery wheel's regeneration side. In heating mode, the energy recovery wheel 110 and desiccant wheel 120 collectively function to heat and humidify the supply air stream 101 using latent and sensible energy recovered from the exhaust air 102 leaving the indoor space.

Prior art dual-wheel energy recovery systems such as the one disclosed in U.S. Pat. No. 6,199,388 to Fischer have been shown to provide improved dehumidification and higher energy efficiency than conventional DX systems or desiccant-only cooling systems. However, due to the reliance on passive regeneration of the desiccant wheel (i.e., regeneration without utilizing external heat), such prior art systems cannot reliably provide supply air having low dew points (e.g., dew points below 45° F.) to the enclosed space.

SUMMARY

A dual-wheel dedicated outdoor air system (DOAS) and method that is capable of operating over a broad spectrum of conditions is disclosed herein. The dual-wheel HVAC system of the present invention utilizes a heating means positioned within the return air passageway in order to optimize the regeneration of the desiccant and energy recovery wheels. By positioning a heating means upstream of the regeneration side of the desiccant wheel, the system is capable of providing supply air having low dew points to the enclosed space while still providing improved energy efficiency over conventional HVAC systems.

In an embodiment exemplifying the principles of the invention, the system may comprise an energy recovery wheel and a desiccant wheel positioned in a series circuit arrangement and each partially within a supply air passageway and partially within a return air passageway. A cooling means preferably is positioned within the supply air passageway between the energy recovery wheel and the desiccant wheel, while a heating means is preferably positioned upstream of the desiccant wheel within the return air passageway. Damper(s) may be utilized to modulate flow within the system.

In a further embodiment exemplifying the principles of the invention, the system may comprise an energy recovery wheel and a desiccant wheel positioned in a series circuit arrangement. The energy recovery wheel is positioned partially within a supply air passageway and partially within a first return air passageway. Meanwhile, the desiccant wheel is positioned partially within a supply air passageway, partially within the first return air passageway, and partially within a second return air passageway. A cooling means preferably is positioned within the supply air passageway between the energy recovery wheel and the desiccant wheel, while a heating means is preferably positioned upstream of the desiccant wheel within the second return air passageway. Damper(s) may be utilized to modulate flow within the system.

The above summary is not intended to describe each illustrated embodiment or every possible implementation. These and other features, aspects, and advantages of the present invention will become better understood with regard to the following description, appended claims, and accompanying drawings.

BRIEF DESCRIPTION OF THE DRAWINGS

The accompanying figures, together with the detailed description below, are incorporated in and form part of the specification, serve to illustrate further various exemplary embodiments and to explain various principles and advantages in accordance with the present invention.

DETAILED DESCRIPTION

Figure 1A:
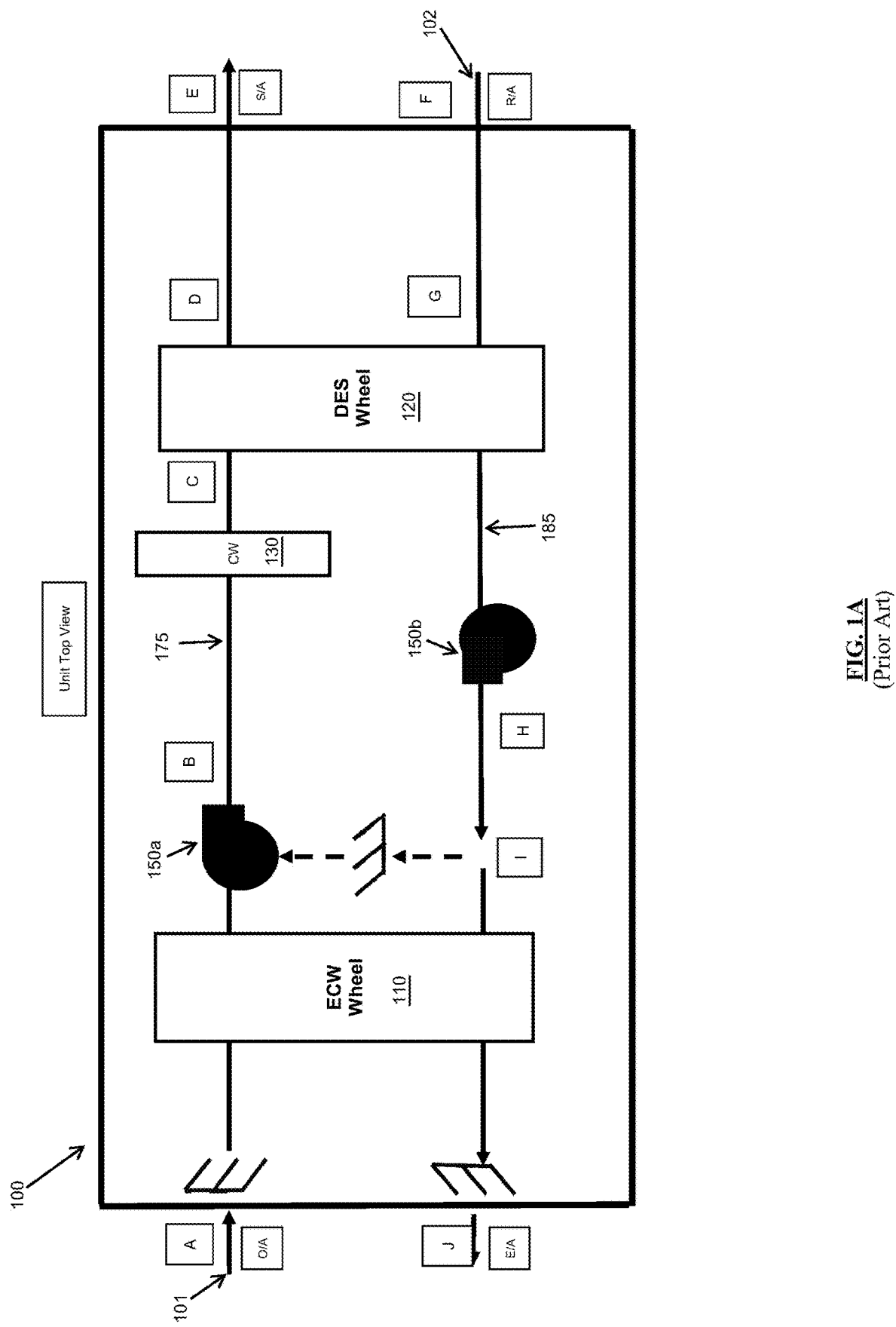
FIG. 1A is a schematic view of a prior art dual-wheel energy recovery system.

Detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Alternate embodiments may be devised without departing from the spirit or the scope of the invention. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

The present invention is directed to an improved dual-wheel dedicated outdoor air system (DOAS) that utilizes a heating means positioned within the return air passageway in order to optimize the regeneration of the desiccant and energy recovery wheels. By positioning a heating means upstream of the regeneration side of the desiccant wheel, the system is capable of providing supply air having low dew points (e.g., dew points below 45° F.) to the enclosed space while still providing improved energy efficiency over conventional DOAS systems.

Figure 2A:
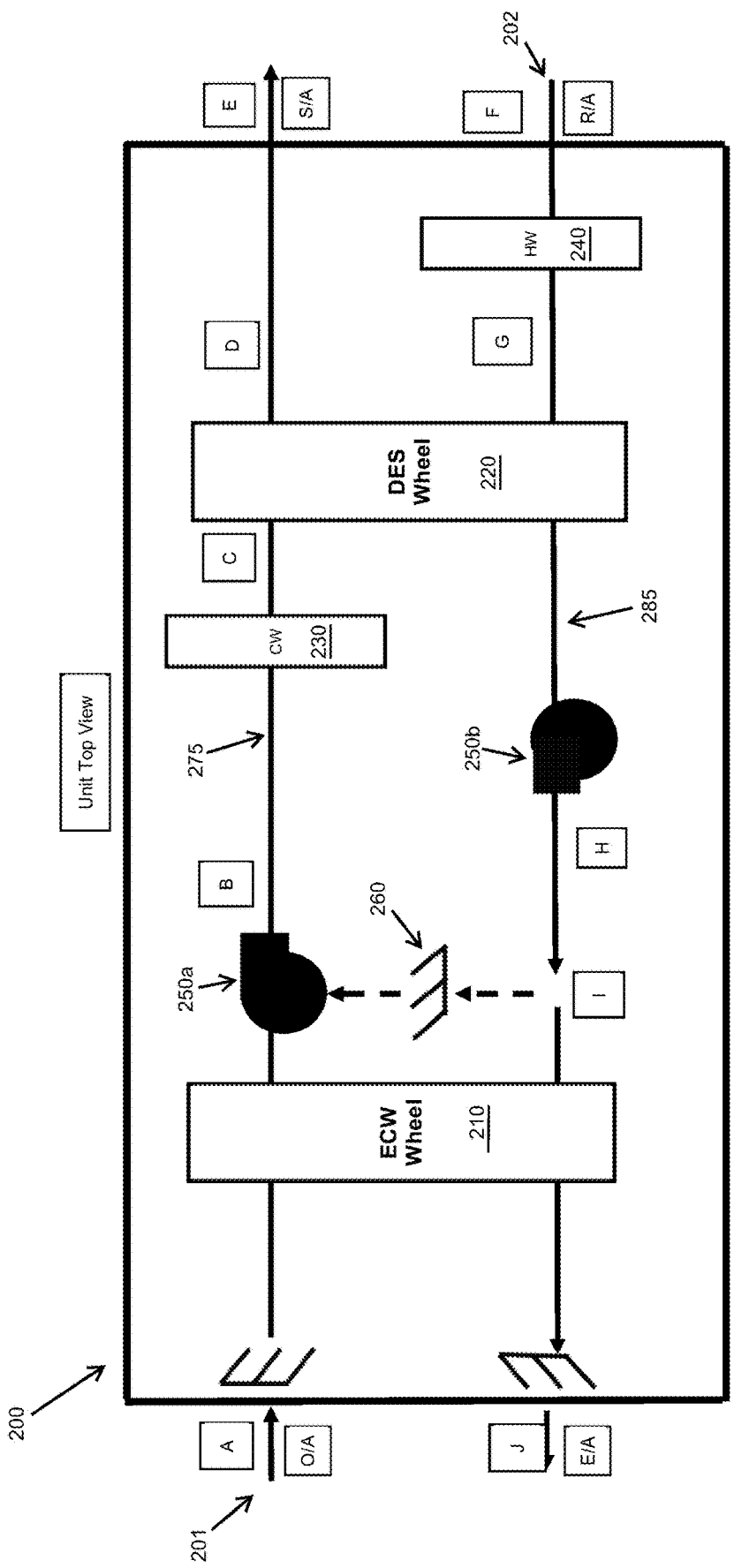
FIG. 2A is a schematic view of an exemplary dual-wheel energy recovery system employing features of the present invention.

A system embodying features of the present invention is shown schematically in FIG. 2A. The system 200 may comprise an energy recovery device 210, and a desiccant wheel 220, a cooling means 230, a heating heat exchanger 240, an air supplier 250a, and an air supplier 250b.

The supply air stream 201 comprises outdoor air drawn from the atmosphere. The return air stream 202 comprises air drawn from a conditioned space. In certain embodiments, a damper 260 may be utilized to route air from the return air stream 202 back into the supply air stream 201 to provide a supply air stream 201 having a mixture of outdoor air and return air.

The energy recovery device 210 and the desiccant wheel 220 are preferably positioned in a series circuit arrangement. In the embodiment depicted in FIG. 2A, the energy recovery device 210 is an energy recovery wheel 210—a rotary counter flow air-to-air heat exchanger capable of transferring both sensible and latent (enthalpy) heat between air streams. In alternative embodiments, the energy recovery device 210 may be other known total energy exchangers, such as counter-flow and cross-flow plate exchangers or heat pipes. The energy recovery wheel 210 is disposed partially within the supply air stream 201 and partially within the return air stream 202. The desiccant wheel 220 is also disposed partially within the supply air stream 201 and partially within the return air stream 202. The energy recovery wheel 210 and the desiccant wheel 220 each may be partitioned into two sections to define a process side and a regeneration side. The "process side" or "process section" of the energy recovery wheel 210 and the desiccant wheel 220 is that portion of each wheel which is exposed to the supply air stream 201 at a given point in time. The "regeneration side" or "regeneration section" of the energy recovery wheel 210 and the desiccant wheel 220 is that portion of each wheel which is exposed to the return air stream 202 at a given point of time. The energy recovery wheel 210 and the desiccant wheel 220 both rotate such that each discrete portion of the wheel cycles through the supply air stream 201 and return air stream 202 in an iterative fashion.

Still referring to FIG. 2A, the cooling means 230 is positioned within the supply air stream 201 for cooling and dehumidifying the supply air. The heating means 240 is positioned within the return air stream 202 for heating the return air. The energy recovery wheel 210 has its process side positioned in the supply air stream 201 upstream of the cooling means 230, and the energy recovery wheel 210 has its regeneration side positioned in the return air stream 202 downstream from the desiccant wheel 220. Meanwhile, the desiccant wheel 220 has its process side positioned in the supply air stream 201 downstream from the cooling means 230, and the desiccant wheel unit 220 has its regeneration side positioned in the return air stream 202 downstream from the heating means 240.

In certain embodiments, the system 200 can be a single unit comprising a first passageway 275 generally parallel to a second passageway 285. In such embodiments, the first air supplier 250a and the cooling means 230 may be positioned within the first passageway 275, while the second air supplier 250b and the heating means 240 may be positioned within the second passageway 285. Both the energy recovery wheel 210 and the desiccant wheel 220 may be located partially within the first passageway 275 and partially within the second passageway 285. A damper 260 can be utilized to modulate flow from the return air stream 202 back into the supply air stream 201. In the depicted embodiment, the first air supplier 250a is positioned in the first passageway 275 between the energy recovery wheel 210 and the cooling means 230, while the second air supplier 250b is positioned in the second passageway 285 between the desiccant wheel 220 and the energy recovery wheel 210. However, in alternative embodiments, the first air supplier 250a can be positioned at other locations within the first passageway 275, and the second air supplier 250b can be positioned at other locations within the second passageway 285. In further other embodiments, the system components may be connected by ductwork. For example, air suppliers 250a, 250b may be positioned externally to the unit and connected by ductwork to the unit. Meanwhile, the energy recovery wheel 210, the desiccant wheel 220, and the other system components may be positioned in individual housings connected by ductwork.

The means for creating the supply air stream 201 and the return air stream 202 can be one or more air suppliers 250 such as fans, blowers, or any other means capable of moving air so as to create an air stream. The heating means 240 can comprise a heating heat exchanger or any means capable of raising the dry-bulb temperature of the air entering the system, including but not limited to direct heat sources (e.g., gas or electric heaters) or indirect heat sources (e.g., steam, hot water, solar, and waste heat from the building). For example, in certain embodiments, a heating coil 240 may be utilized to efficiently transfer heat from a steam, boiler water, solar water or high temperature hot water system to the return air stream 202.

The cooling means 230 can comprise a cooling heat exchanger or any other means capable of cooling and/or dehumidifying a passing air stream. For example, in certain embodiments, a cooling tower can be utilized in combination with a water-cooled chiller to provide cooled water to a cooling coil 230 installed within the system 200. Open-loop or closed-loop cooling systems may also be utilized.

In one particular embodiment, a vapor-compression refrigeration system (DX system) may be utilized, with the condenser serving as the heating heat exchanger 240 and the direct expansion evaporator coil serving as the cooling heat exchanger 230. In another embodiment, a chiller or a cooling tower may be utilized, with a cold-water coil serving as the cooling heat exchanger 230 and a hot-water coil serving as the heating heat exchanger 240. Though more costly to install and more complicated to operate, chiller-based systems offer a number of benefits over DX systems, including greater energy efficiency, better controllability, and longer life. Additionally, a chiller-based system can be much more efficient in terms of space utilization within the building because HVAC components need not be located within the same space. For example, the piping required for chiller-based systems is much smaller than the air ducts necessary for DX systems to provide high-velocity airflow throughout the building. The coefficient of performance (COP) of chiller plants depend on the chilled water temperature provided to the controlled space (usually 45° F.) and the cooling tower water temperature (usually 85° F.). The COP improves as the chilled water temperature rises and/or the cooling tower water temperature drops.

In cooling mode, the energy recovery wheel 210 functions to cool and dehumidify the supply air stream 201 (i.e., the supply air) by transferring sensible and latent energy (moisture and heat) from the supply air stream 201 into the energy recovery wheel 210 as the supply air stream 201 passes through the process side of the wheel (the portion between Points A-B). The supply air stream 201 is further cooled and dehumidified by passing it across the cooling coil 230 (i.e., the portion between Points B-C). The supply air stream 201 is then warmed and further dehumidified by passing it through the process side of the desiccant wheel 220 (the portion between Points C-D). The supply air stream 201 is then provided to the conditioned space. Meanwhile, the return air stream 202 functions to regenerate both the desiccant wheel 220 and the energy recovery wheel 210 by absorbing energy from the two wheels as the return air stream 202 passes sequentially through the regeneration sides of the desiccant wheel 220 and the energy recovery wheel 210. To optimize the regeneration of the energy recovery wheel 210 and desiccant wheel 220, the system 200 utilizes a heating means 240 positioned within the return air stream 202 upstream from the regeneration side of the desiccant wheel 220. The return air stream 202 will first be heated as it is passed across the heating means 240 (the portion between Points F-G). The return air stream 202 will then be transmitted through the regeneration side of the desiccant wheel 220, absorbing latent energy (i.e., moisture) from the desiccant wheel 220 while also heating the desiccant wheel 220 (the portion between Points G-H). Lastly, the return air stream 202 will be transmitted through the regeneration side of the energy recovery wheel 210, absorbing sensible and latent energy from the energy recovery wheel 210 (the portion between Points I-J).

In heating mode, the energy recovery wheel 210 and desiccant wheel 220 collectively function to heat and humidify the supply air stream 201 using latent and sensible energy recovered from the return air stream leaving the indoor space. The system 200 in heating mode preferably includes a heat source located in the first passageway 275 either upstream or downstream of the desiccant wheel 220.

Figure 3A:
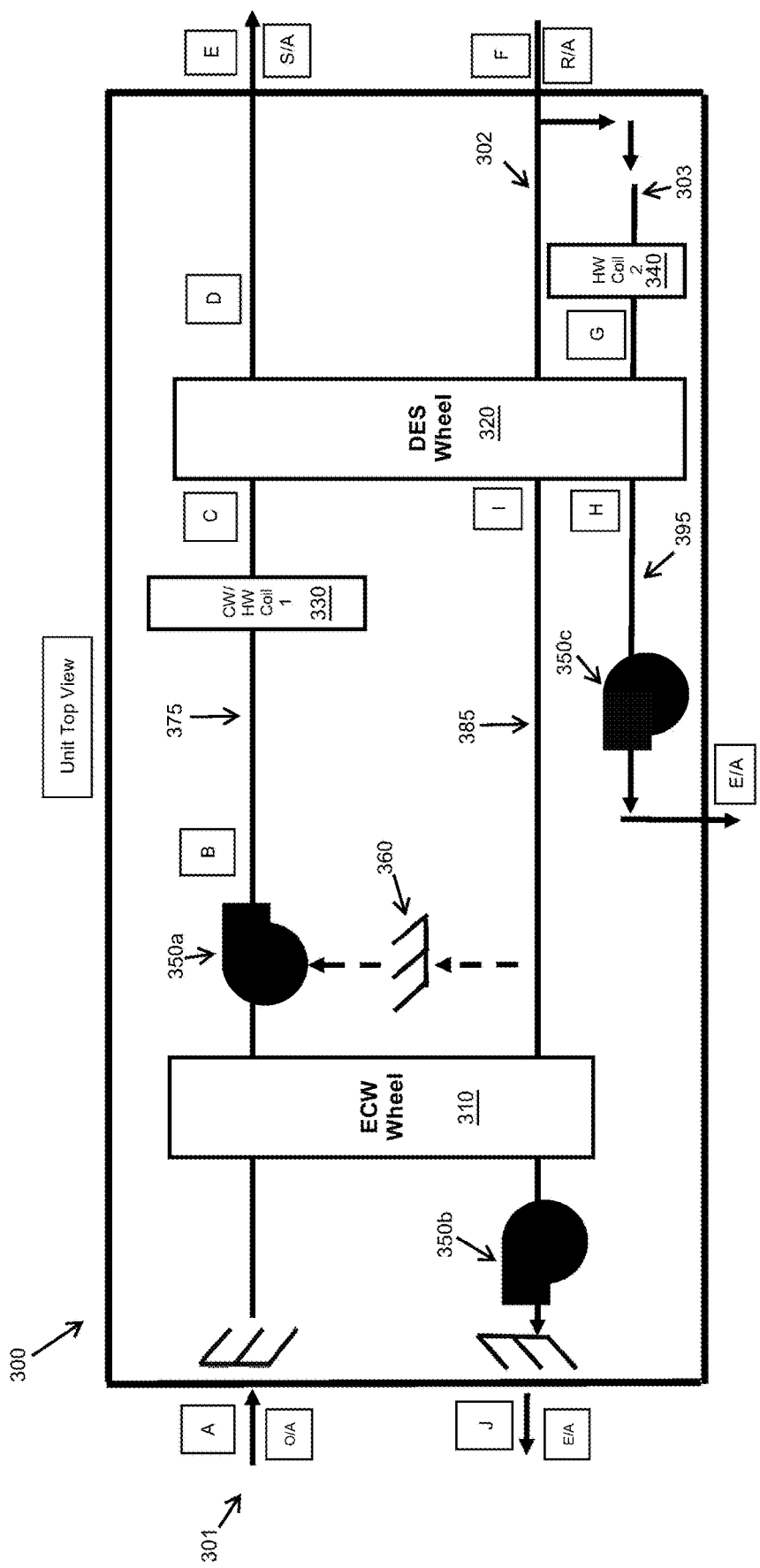
FIG. 3A is a schematic view of another exemplary dual-wheel energy recovery system employing features of the present invention.

FIG. 3A illustrates another embodiment of a dual-wheel HVAC system in accordance with the teachings of the present invention, in which similar components in system 300 to those in system 200 (see FIG. 2A) are denoted by similar reference numerals increased by 100. The system 300 utilizes a split return air approach to maximize the regeneration of the desiccant wheel 320 and to maximize the efficiency of the energy recovery wheel 310, which in turn increases the overall efficiency of the system 300 and allows the unit to achieve supply air dew points as low as 32° F. The desiccant wheel 320 is configured to rotate in a direction to allow the freshly processed portion of the desiccant wheel 320 to first come into contact with untreated return air (i.e., the first return air stream 302) before rotating into contact with treated (i.e., preheated) return air (i.e., the second return air stream 303). Because the transfer of moisture between the passing air and the desiccant is dependent on a surface vapor pressure gradient, rotating the freshly processed portion of the wheel 320 sequentially through the untreated return air and then the treated return air optimizes latent energy transfer from the desiccant wheel 320 into the first and second return air streams 302, 303. This sequential desorption technique provides a mechanism for more effectively drying the desiccant wheel 320. The result is a system 300 that has improved energy efficiency and an expanded operational range, including providing supply air having lower dew points when compared to conventional parallel-path systems.

Referring to FIG. 3A, the system 300 may comprise an energy recovery device 310 (e.g., an energy recovery wheel), a desiccant wheel 320, a cooling means 330, a heating means 340, a means for creating a supply air stream 301 (e.g., an air supplier 350a), a means for creating a first return air stream 302 (e.g., an air supplier 350b), and a means for creating a second return air stream 303 (e.g., an air supplier 350c). The first air supplier 350a and the cooling means 330 may be positioned within the first passageway 375, the second air supplier 350b may be positioned within the second passageway 385, and the third air supplier 350c and the heating means 340 may be positioned within the third passageway 395. However, in alternative embodiments, a single air supplier may be utilized for creating the first and second return air streams 302, 303 by placing the air supplier proximate to the return air inlet. The energy recovery wheel 310 may be located partially within the first plenum or passageway 375 and partially within the second plenum or passageway 385. Meanwhile, the desiccant wheel 320 may be located partially within the first passageway 375, partially within the second passageway 385, and partially within the third plenum or passageway 395. A damper 360 can be utilized to modulate flow from the first return air stream 302 back into the supply air stream 301. Additional dampers (see FIGS. 5, 7-9) can be utilized to adjust the percentage of the return air stream that is preheated versus untreated prior to being transmitted through the desiccant wheel 320. For example, during operations necessitating dehumidification, a damper positioned proximate to the return air inlet can be modulated to direct a portion of the return air stream into the third passageway 395 housing a hot water coil 340. The remainder of the return air will be directed into the second passageway 385 leading to the first regen section of the desiccant wheel 320. Typically, 0-90% of the return air will be directed into the second passageway 385 during dehumidification operation, with the remainder being directed into the third passageway 395. More typically, 50-80% of the return air will be directed into the second passageway during dehumidification operation. A damper (see FIGS. 7-9) positioned within the third passageway 395 downstream from the desiccant wheel 320 can be modulated to adjust the amount of preheated air leaving the desiccant wheel's second regen section that is transmitted through the regeneration side of the energy recovery wheel 310.

In cooling mode, the energy recovery wheel 310 functions to cool and dehumidify the supply air stream 301 (i.e., the supply air) by transferring sensible and latent energy (moisture and heat) from the supply air stream 301 into the energy recovery wheel 310 as the supply air stream 301 passes through the process side of the wheel (the portion between Points A-B). The supply air stream 301 is further cooled and dehumidified by passing it across the cooling coil 330 (the portion between Points B-C). The supply air stream 301 is then warmed and further dehumidified by passing it through the process side of the desiccant wheel 320 (the portion between Points C-D). The supply air stream 301 is then provided to the conditioned space. Meanwhile, the system 300 utilizes a split return air approach for regenerating the desiccant wheel 320 and the energy recovery wheel 310. The return air comprises two distinct air streams: a first return air stream 302 and a second return air stream 303. The first return air stream 302, which comprises untreated return air, will first absorb latent energy from the desiccant wheel 320 as the first return air stream 302 passes through a first portion of the regeneration side of the desiccant wheel 320 (the portion between Points F-I). Then the first return air stream 302 will pass through the regeneration side of the energy recovery wheel 310 (the portion between Points I-J), absorbing both sensible and latent energy from the energy recovery wheel 310. Contemporaneously, the second return air stream 303, which comprises treated (i.e., heated) return air, will first be heated as it is passed across the heating means 340 (the portion between Points F-G). The second return air stream 303 will then be transmitted through a second portion of the regeneration side of the desiccant wheel 320 (the portion between Points G-H), absorbing latent energy from the desiccant wheel 320 while also heating the desiccant wheel 320. The desiccant wheel 320 is configured to rotate in a first direction such that a freshly processed portion of the desiccant wheel 320 first comes into contact with the first return air stream 302 before rotating into contact with the second return air stream 303. After passing through the desiccant wheel 320, the second return air stream 303 is exhausted from the system. Meanwhile, the first return air stream 302 is passed through the regeneration side of the energy recovery wheel 310, absorbing both sensible and latent energy from the wheel 310, before being exhausted from the system.

In heating mode, the energy recovery wheel 310 and desiccant wheel 320 collectively function to heat and humidify the supply air stream 301 using latent and sensible energy recovered from the second air stream leaving the indoor space. The system 300 in heating mode preferably would include a heat source located in the first passageway 375 either upstream or downstream of the desiccant wheel 320.

Figure 3B:
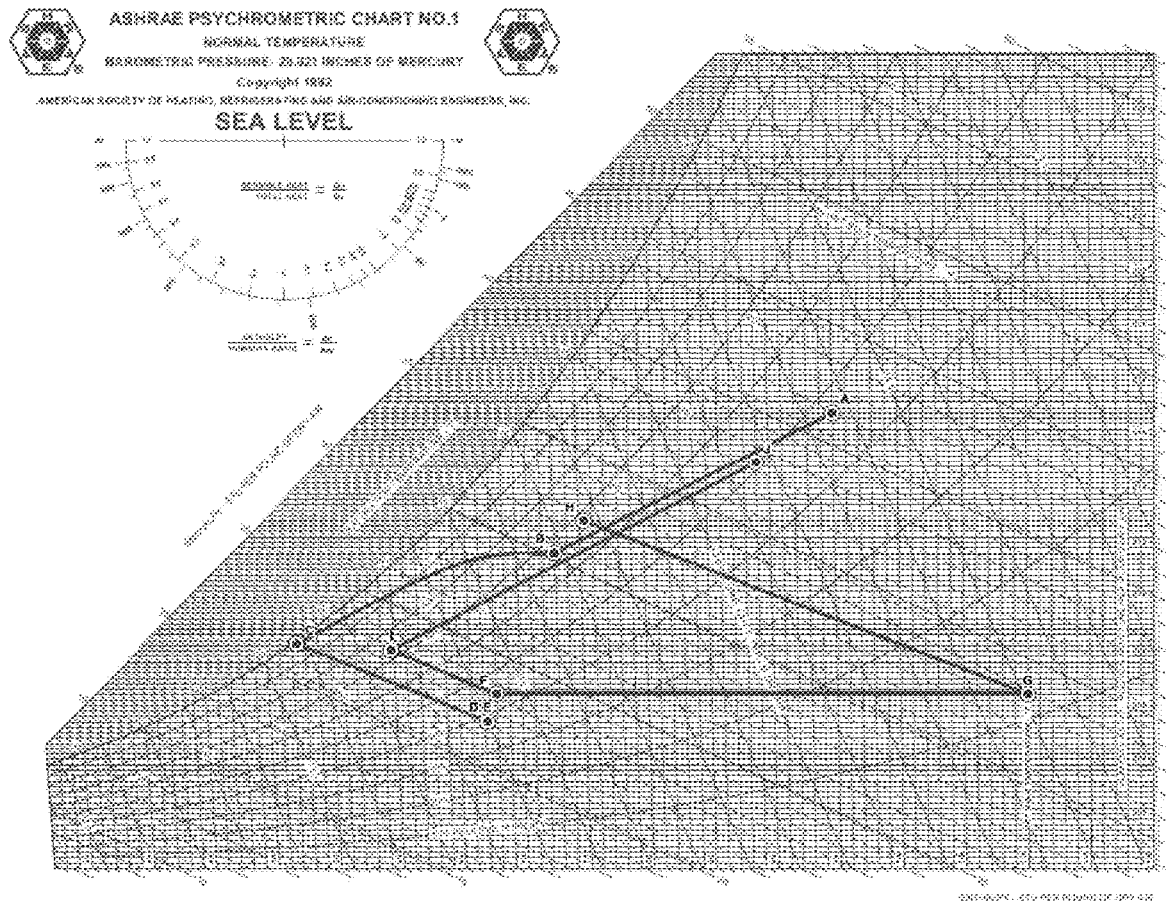
FIG. 3B is a psychrometric chart showing the performance of the dual-wheel energy recovery system depicted in FIG. 3A at a dry bulb temperature of 95° F.
Figure 3C:
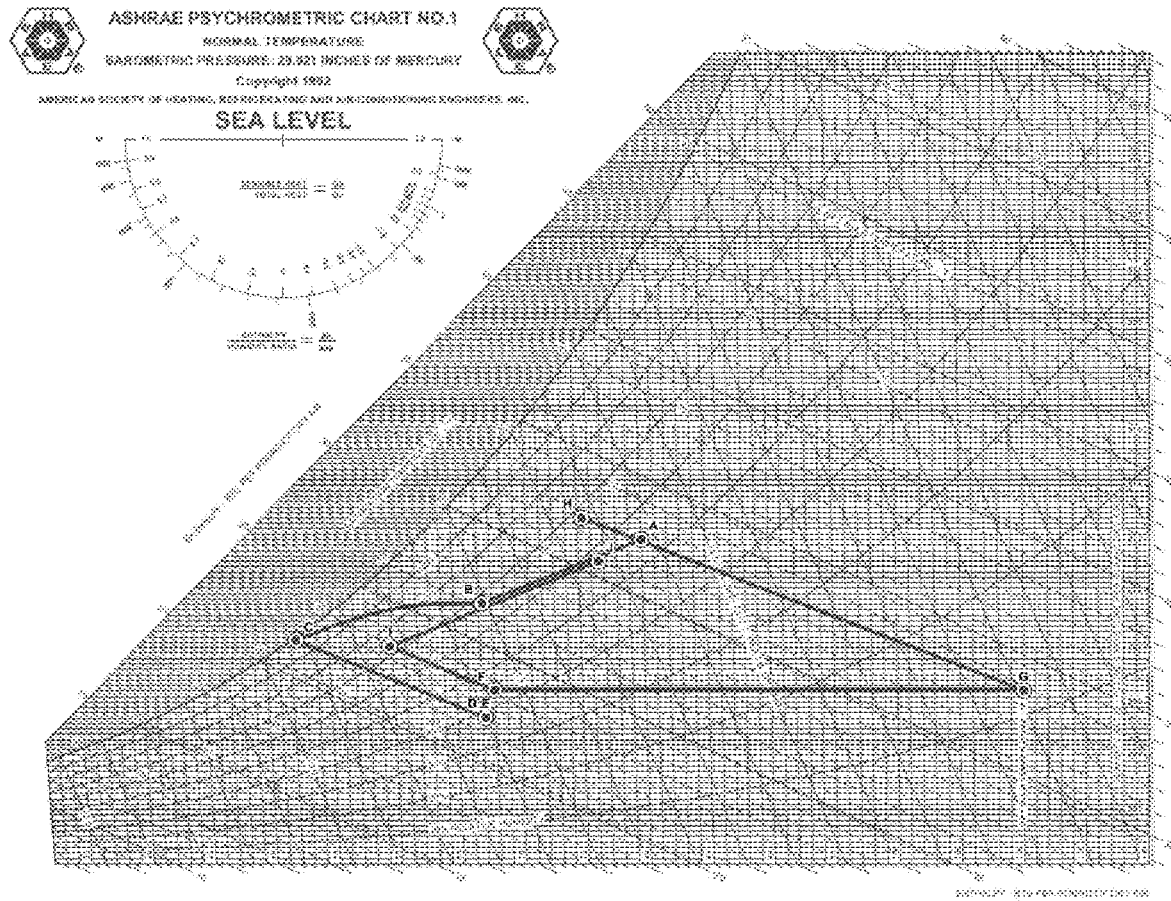
FIG. 3C is a psychrometric chart showing the performance of the dual-wheel energy recovery system depicted in FIG. 3A at a dry bulb temperature of 80° F.
Figure 3D:
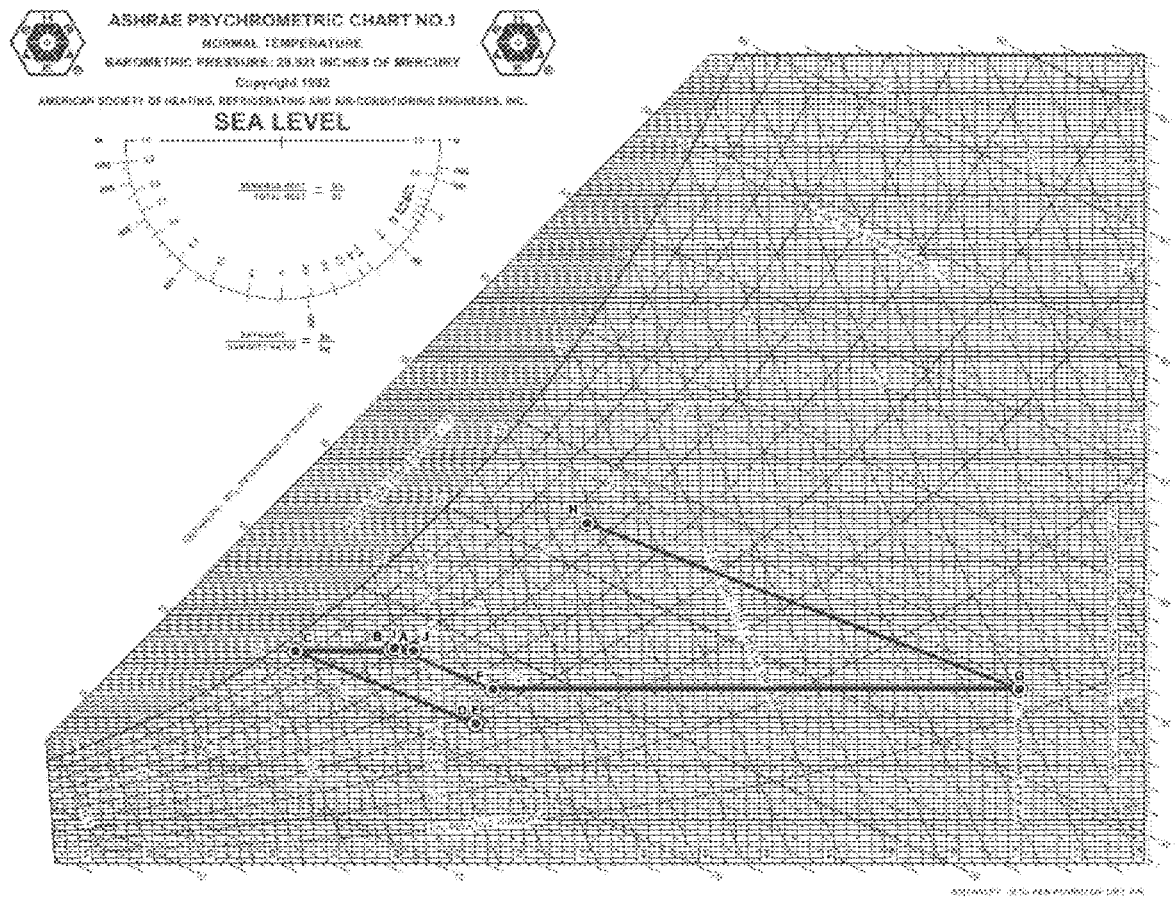
FIG. 3D is a psychrometric chart showing the performance of the dual-wheel energy recovery system depicted in FIG. 3A at a dry bulb temperature of 60° F.
Figure 4:
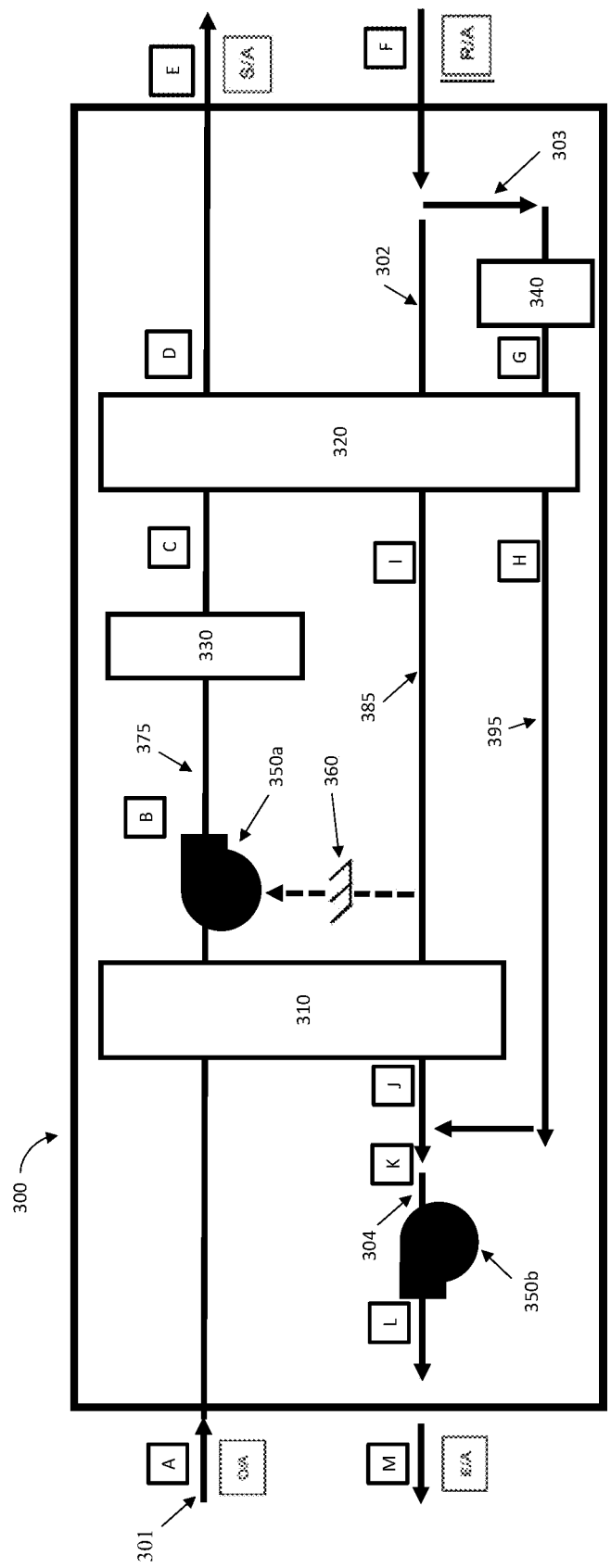
FIG. 4 is a schematic view of another embodiment of a dual-wheel energy recovery system employing features of the present invention.

Referring now to FIG. 4, another embodiment of a dual-wheel HVAC system in accordance with the teachings of the present invention is illustrated. The embodiment depicted in FIG. 4 is substantially similar to the embodiment depicted in FIG. 3, thus similar components in system 300 depicted in FIG. 4 are denoted by identical reference numerals utilized in FIG. 3. Like the system 300 in FIG. 3, the system 300 in FIG. 4 utilizes a split return air approach to maximize the regeneration of the desiccant wheel 320 and to maximize the efficiency of the energy recovery wheel 310, which in turn increases the overall efficiency of the system 300 and allows the unit to achieve supply air dew points as low as 32° F. In FIG. 4, the system 300 utilizes only a single air supplier 350*b* to generate the return air streams 302, 303. In the embodiment depicted in FIG. 4, the air supplier 350*b* is positioned within the second passageway 385 downstream from the energy recovery wheel 310. The third passageway 395 bypasses the energy recovery wheel 310 and is fluidly connected to the second passageway 385 downstream from the regeneration side of the energy recovery wheel 310. In this arrangement, the air supplier 350*b* is capable of drawing return air into the system 300 through the second and third passageways 385, 395, thereby creating the first and second return air streams 302, 303. The first return air stream 302 will pass through the regeneration side of the energy recovery wheel 310 (the portion between Points I-J), absorbing both sensible and latent energy from the energy recovery wheel 310. Contemporaneously, the second return air stream 303, which comprises treated (i.e., heated) return air, will first be heated as it is passed across the heating means 340 (the portion between Points F-G). The second return air stream 303 will then be transmitted through a second portion of the regeneration side of the desiccant wheel 320 (the portion between Points G-H), absorbing latent energy from the desiccant wheel 320 while also heating the desiccant wheel 320. The desiccant wheel 320 is configured to rotate in a first direction such that a freshly processed portion of the desiccant wheel 320 first comes into contact with the first return air stream 302 before rotating into contact with the second return air stream 303. After passing through the desiccant wheel 320, the second return air stream 303 bypasses the energy recovery wheel 310 and is then mixed with the first return air stream 302 downstream of the energy recovery wheel 310, thereby forming a mixed return air stream 304 which is exhausted from the system. In the embodiment depicted in FIG. 4, the air supplier 350*b* is shown positioned in the second passageway 385. In this arrangement, the third passageway 395 will be fluidly connected to the second passageway 385 via an opening in a partition separating the second and third passageways 385, 395, via ductwork, or via any other means known in the art. In alternative embodiments, the air supplier 350b may be located in the third passageway 395, with the second passageway 285 being fluidly connected to the third passageway 395. In further alternative embodiments, the air supplier 350b may be located in the second passageway 385 proximate to the return air inlet.

Figure 5:
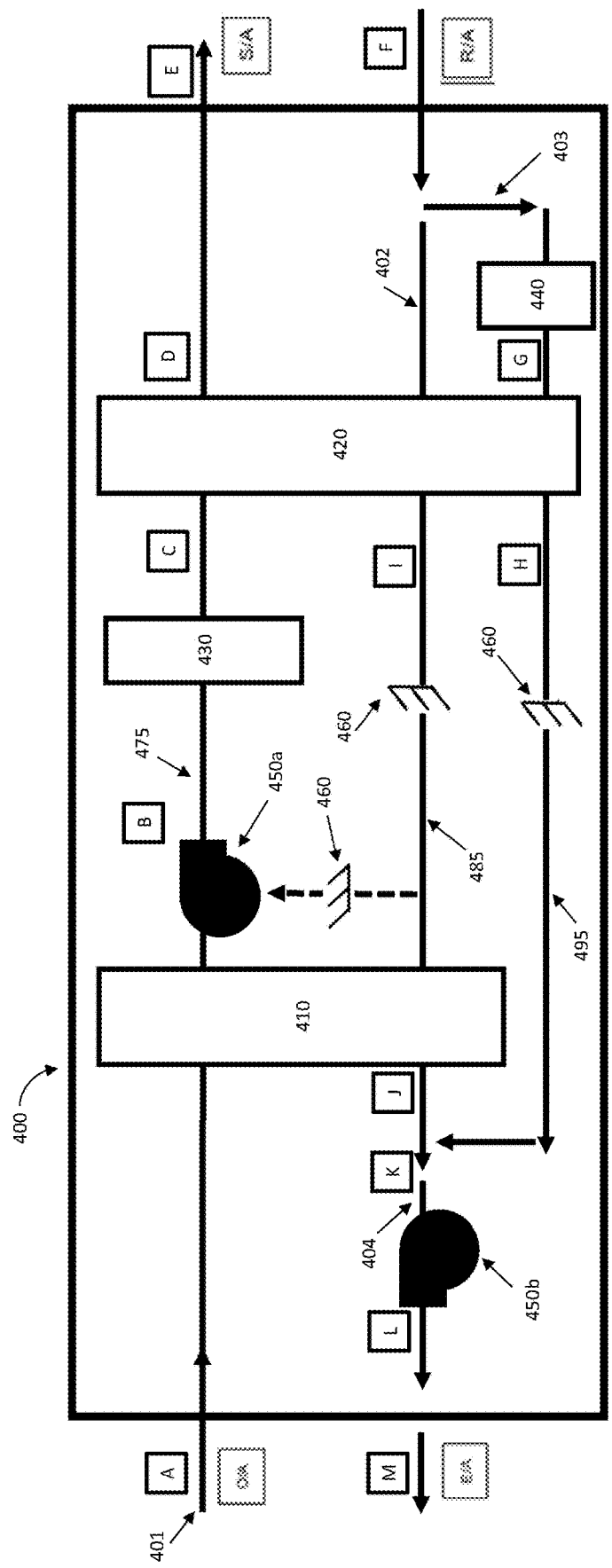
FIG. 5 is a schematic view of another embodiment of a dual-wheel energy recovery system employing features of the present invention.

FIG. 5 illustrates another embodiment of a dual-wheel HVAC system in accordance with the teachings of the present invention, in which similar components in system 400 to those in system 300 (see FIG. 4) are denoted by similar reference numerals increased by 100. Like the system 300, system 400 utilizes a split return air approach to maximize the regeneration of the desiccant wheel 420 and to maximize the efficiency of the energy recovery wheel 410, which in turn increases the overall efficiency of the system 400. However, system 400 differs from system 300 in that dampers 460 have been placed in the second and third passageways 485, 495 in order to control the percentage of the return air stream that is preheated versus untreated prior to being transmitted through the desiccant wheel 420. The utilization of dampers 460 in the second and third passageways 485, 495 allows for the system 400 to be optimized based upon the outside air conditions and the desired conditions of the controlled space. For example, during operations necessitating increased dehumidification of the supply air, the dampers 460 can be modulated such that a greater portion of the return air is directed through the third passageway 495 housing the heating means 440. The remainder of the return air will be directed into the second passageway 485 leading to the first regen section of the desiccant wheel 420.

Figure 6A:
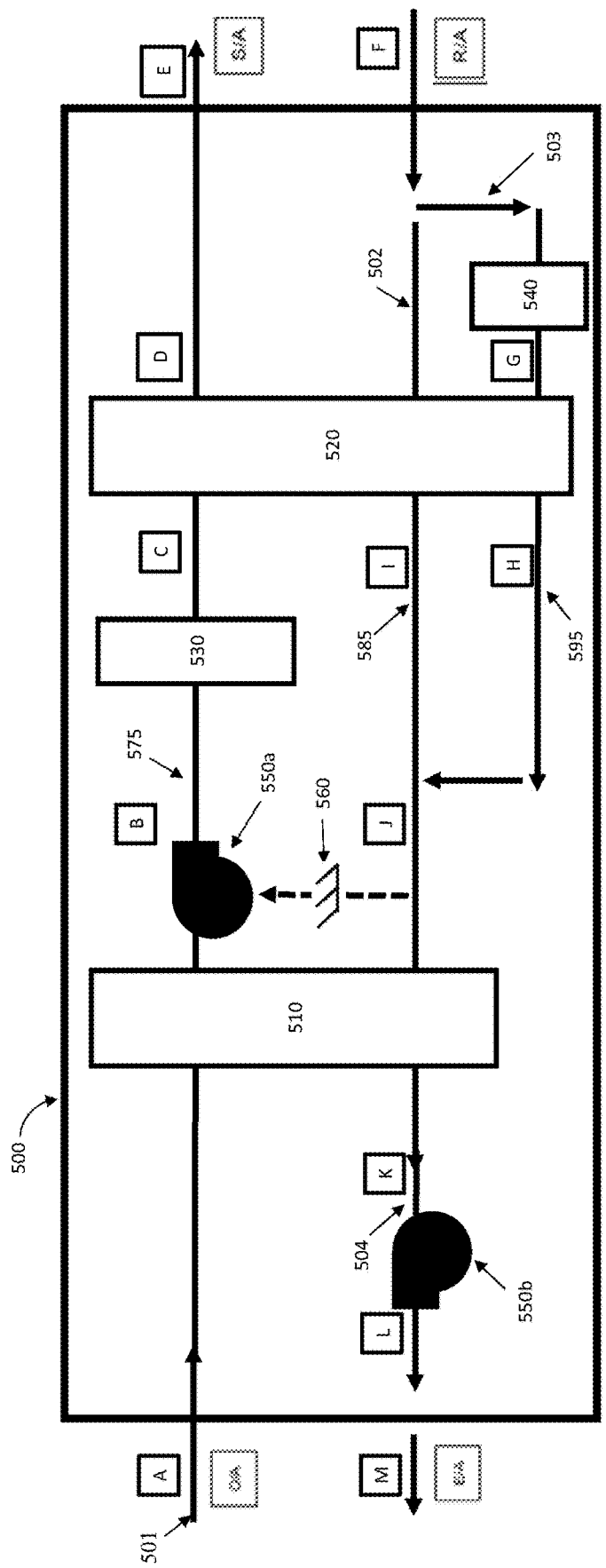
FIG. 6A is a schematic view of another embodiment of a dual-wheel energy recovery system employing features of the present invention.

FIG. 6A illustrates another embodiment of a dual-wheel HVAC system in accordance with the teachings of the present invention, in which similar components in system 500 to those in system 300 (see FIGS. 3A and 4) are denoted by similar reference numerals increased by 200. Like the system 300, system 500 utilizes a split return air approach to maximize the regeneration of the desiccant wheel 520 and to maximize the efficiency of the energy recovery wheel 510, which in turn increases the overall efficiency of the system 500. However, system 500 differs from system 300 in that the third passageway 595 is fluidly connected to the second passageway 585 downstream from the regeneration side of the desiccant wheel 520 but upstream of the regeneration side of the energy recovery wheel 510. In this arrangement, the second return air stream 503 leaving the regeneration side of the desiccant wheel 520 will be mixed with the first return air stream 502 leaving the regeneration side of the desiccant wheel 520 to form a mixed return air stream 504. The mixed return air stream 504 will then be transmitted through the regeneration side of the energy recovery wheel 510. This embodiment is particularly advantageous during summer operations where the second return air stream 503 has a lower enthalpy leaving the regeneration side of the desiccant wheel 520 than the outside air.

Figure 7:
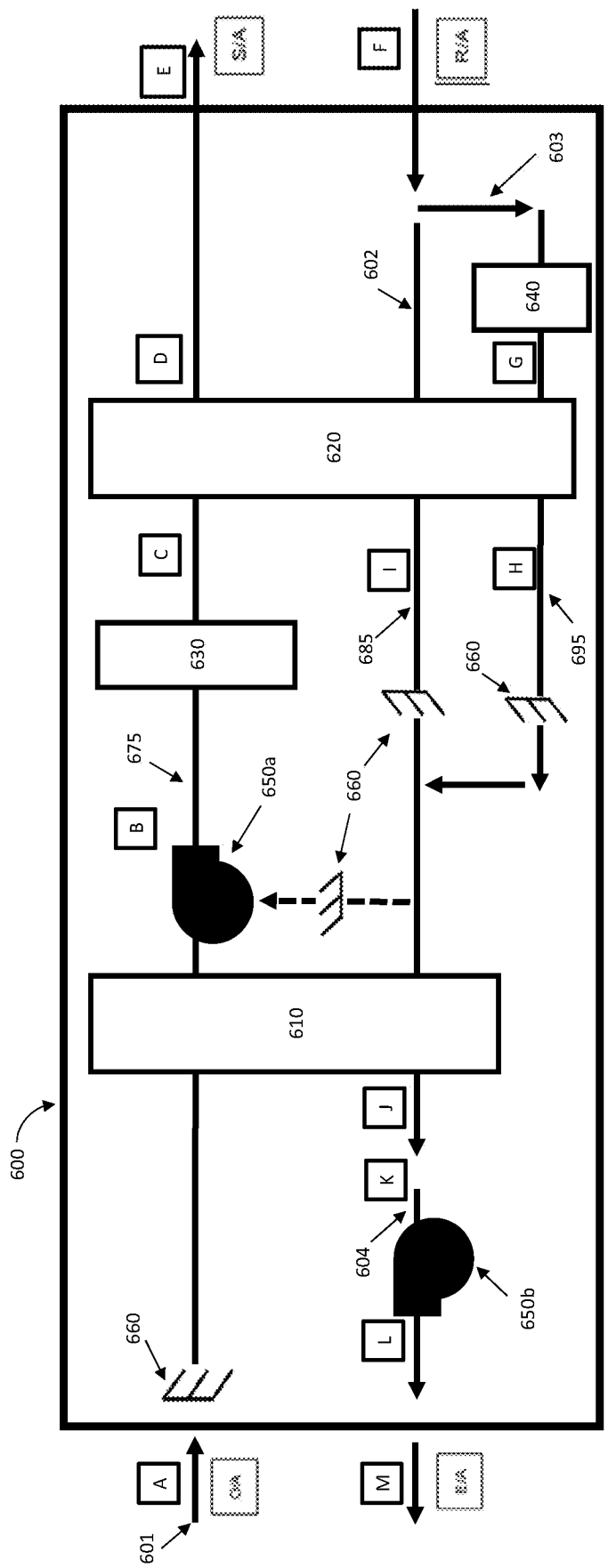
FIG. 7 is a schematic view of another embodiment of a dual-wheel energy recovery system employing features of the present invention.

FIG. 7 illustrates another embodiment of a dual-wheel HVAC system in accordance with the teachings of the present invention, in which similar components in system 600 to those in system 500 (see FIG. 6A) are denoted by similar reference numerals increased by 100. Like the system 500, system 600 utilizes a split return air approach to maximize the regeneration of the desiccant wheel 620 and to maximize the efficiency of the energy recovery wheel 610, which in turn increases the overall efficiency of the system 600. However, system 600 differs from system 500 in that dampers 660 have been placed in the second and third passageways 685, 695 in order to control the percentage of the return air stream that is preheated versus untreated prior to being transmitted through the desiccant wheel 620. The utilization of dampers 660 in the second and third passageways 685, 695 allows for the system 600 to be optimized based upon the outside air conditions and the desired conditions of the controlled space. For example, during operations necessitating increased dehumidification of the supply air, the dampers 660 can be modulated such that a greater portion of the return air is directed through the third passageway 695 housing the heating means 640. The remainder of the return air will be directed into the second passageway 685 leading to the first regen section of the desiccant wheel 620. The second return air stream 603 leaving the regeneration side of the desiccant wheel 620 then will be mixed with the first return air stream 602 leaving the regeneration side of the desiccant wheel 620 to form the mixed return air stream 604. The mixed return air stream 604 will then be transmitted through the regeneration side of the energy recovery wheel 610.

Figure 8:
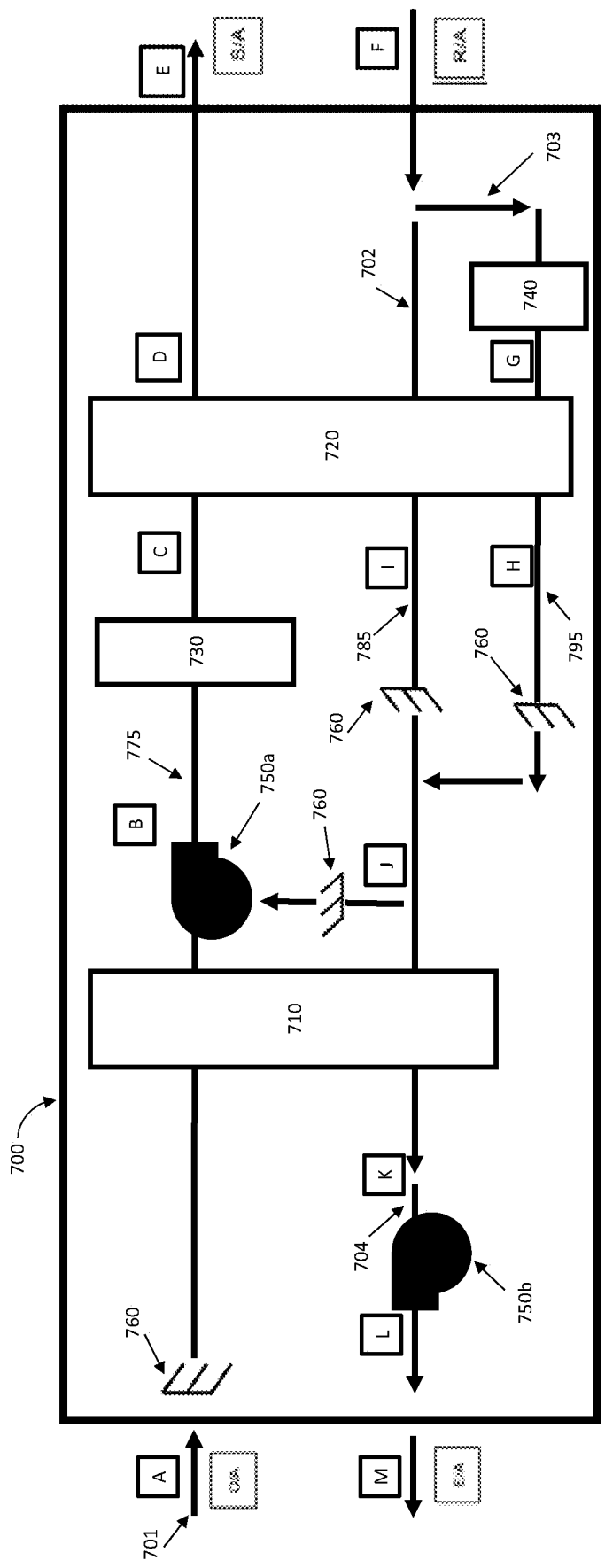
FIG. 8 is a schematic view of another embodiment of a dual-wheel energy recovery system employing features of the present invention.

FIG. 8 illustrates another embodiment of a dual-wheel HVAC system in accordance with the teachings of the present invention, in which similar components in system 700 to those in system 600 (see FIG. 7) are denoted by similar reference numerals increased by 100. Like the system 600, system 700 utilizes a split return air approach to maximize the regeneration of the desiccant wheel 720 and to maximize the efficiency of the energy recovery wheel 710, which in turn increases the overall efficiency of the system 700. However, system 700 differs from system 500 in that the first and second passageways 775, 785 are fluidly connected to one another, with a damper 760 being utilized to selectively route air from the mixed return air stream 704 back into the supply air stream 701 downstream of the energy recovery wheel 710. In this arrangement, the system 700 is capable of providing a supply air stream 701 having a mixture of outdoor air and return air. The proportion of mixture of outdoor air and return air can range from 0-100% depending on the outside air conditions and the desired conditions of the controlled space. In the embodiment depicted in FIG. 8, a partition separates the first and second passageways 775, 785, with the damper 760 being positioned in an opening formed in the partition. In alternative embodiments whereby the first and second passageways 775, 785 are connected via ductwork, the damper 760 can be positioned within said ductwork.

Figure 9:
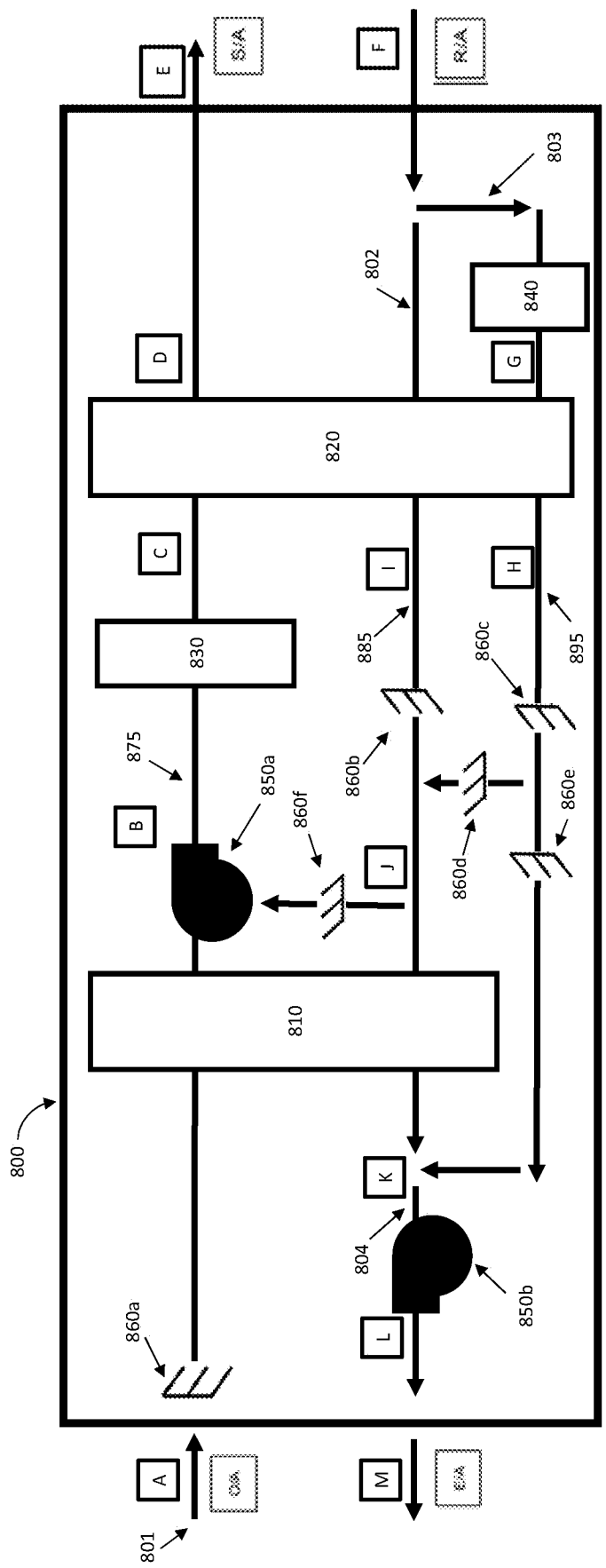
FIG. 9 is a schematic view of another embodiment of a dual-wheel energy recovery system employing features of the present invention.

Referring now to FIG. 9, another embodiment of a dual-wheel HVAC system in accordance with the teachings of the present invention is depicted. In FIG. 9, the concepts of FIG. 5 and FIG. 8 are combined into a single system 800. The system 800 utilizes multiple dampers 860 in order to allow the system to be optimized based upon the outside air conditions and the desired conditions of the controlled space. In the depicted embodiment, second and third dampers 860b, 860c are located in the second and third passageways 885, 895, respectively in order to control the percentage of the return air stream that is preheated versus untreated prior to being transmitted through the desiccant wheel 820. A fourth damper 860d can be placed in the partition separating the second and third passageways 885, 895. A fifth damper 860e can be positioned in the third passageway 895 downstream of the third damper 860c. In this arrangement, the fourth and fifth dampers 860d, 860e can be modulated to control the amount of the second return air stream 803 that is mixed with the first return air stream 802 to form the mixed return air stream 804a for regenerating the energy recovery wheel 810. The remainder of the second return air stream 803 will be transmitted through the third passageway 895 and bypass the energy recovery wheel 810 before being mixed with the first return air stream 802 to form the mixed return air stream 804b. The amount of the second return air stream 803 that is mixed with the first return air stream 802 to form the mixed return air stream 804a can range from 0-100% depending on the outside air conditions and the desired conditions of the controlled space. The system 800 further comprises a sixth damper 860f for selectively routing a percentage of the air from the mixed return air stream 804a back into the supply air stream 801 at a position downstream of the energy recovery wheel 710 yet upstream of the cooling means 830. In this arrangement, the system 800 is capable of providing a supply air stream 801 having a mixture of outdoor air and return air. As with earlier discussed embodiments, the first, second, and third passageways 875, 885, 895 can be separated by partitions, with dampers 860d and 860f being positioned in openings formed in each partition. In alternative embodiments whereby the first, second, and third passageways 875, 885, 895 are connected via ductwork, dampers 860d and 860f can be positioned within said ductwork.

EXAMPLES

Computer simulations were run to compare the performance of the disclosed systems against the prior art dual-wheel energy recovery system disclosed in U.S. Pat. No. 6,199,388 to Fischer (hereinafter the "Fischer system") when processing outdoor air and return air from a large indoor space, such as a hospital. For each simulation, Novelaire Model No. ECW786 energy recovery wheels were utilized as the tested system's energy recovery wheel, and Model No. DES786 desiccant wheels were utilized as the tested system's desiccant wheel. Novelaire Model No. ECW786 is an energy recovery (i.e., conservation) wheel comprising corrugated synthetic fiber-based media impregnated with a non-migrating water selective molecular sieve desiccant. The wheel diameter is 78 inches with a depth of 6 inches. Novelaire Model No. DES786 is a high performance silica gel (WSG) desiccant wheel having a diameter of 78 inches and a depth of 6 inches. For comparison purposes, electrical power has been assumed to cost $0.10/Kwh, natural gas has been assumed to cost $10.00/MMBTU, and a chiller COP of 4.5 has been assumed for each simulation.

Example 1

Prior Art

Figure 1B:
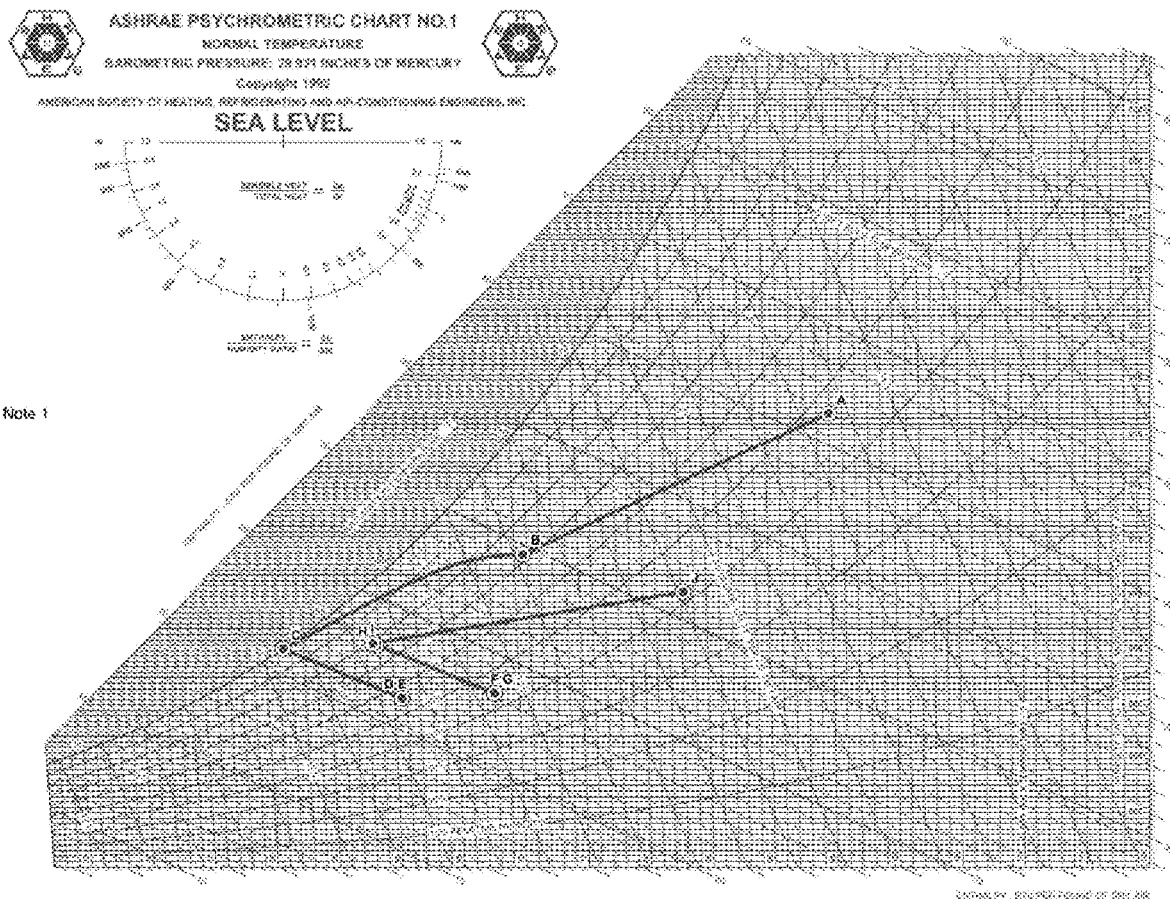
FIG. 1B is a psychrometric chart showing the performance of the dual-wheel energy recovery system depicted in FIG. 1A.

Referring to the psychometric chart depicted in FIG. 1B, an example of the performance of the dehumidification system depicted in FIG. 1A is shown. In this example, the system 100 is utilizing a Novelaire Model No. ECW786 energy recovery wheel 110 rotating at 35 revolutions per minute, a Novelaire Model No. DES786 desiccant wheel 120 rotating at 8 revolutions per hour, a 15 HP supply air fan 150a, and a 15 HP return air fan 150b. Summer operations are presumed with a 95° F. outdoor temperature.

Referring to FIG. 1B, a supply air stream 101 having a dry-bulb temperature of 95.0° F. and moisture contents of 117.6 grains/lb (Point A) is drawn into the supply air passageway 175 by the supply air fan 150a. The supply air stream 101 is cooled to 70.7° F. and dehumidified to 81.2 grains/lb (Point B) as the air passes through the process side of the energy recovery wheel 110. Next, the supply air stream 101 passes through the chilled water coil 130 where it is cooled beyond its dew point (61.1° F.) to remove moisture via condensation. Leaving the cooling coil 130, the supply air stream 101 is at 51.4° F., 100.0% relative humidity, and a moisture content of to 56.7 grains/lb (Point C). Next, the supply air stream 101 is heated and further dehumidified as it passes through the process side of the desiccant wheel 120. The supply air 101 entering the conditioned space exhibits a dry bulb temperature of 60.6° F., 55.5% relative humidity, and a moisture content of to 43.4 grains/lb (Point D). Meanwhile, a return air stream 102 having a dry-bulb temperature of 68.0° F. and moisture contents of 44.8 grains/lb (Point F) is drawn into the return air passageway 185 by the return air fan 150b. The return air stream 102 is passed through the regeneration side of the desiccant wheel 120 in order to regenerate the desiccant wheel by absorbing moisture. Leaving the regeneration side of the desiccant wheel 120, the return air stream 102 is at 58.5° F., 79.1% relative humidity, and a moisture content of to 58.1 grains/lb (Point H). Lastly, the return air stream 102 is passed through the regeneration side of the energy recovery wheel 110, absorbing both sensible and latent energy from the wheel 110. The return air stream 102 is exhausted from the system 100 at 83.2° F., 41.8% relative humidity, and a moisture content of 71.4 grains/lb (Point J). Under these parameters, the power consumption of the system 100 is 38.1 kW, the cooling effect is 900,368 Btu/hr, the total moisture extraction is 474.4 lb/hr, and the operating cost is $0.008/lb of water removed.

Example 2

In the embodiment of the present invention depicted in FIG. 2A, a hot water coil is added to the system 200 upstream from the regeneration side of the desiccant wheel 220 to preheat the return air 202 before the air passes through the desiccant wheel 220. By increasing the temperature of the return air stream 202, the desiccant wheel 220 is regenerated (i.e., dried) to a greater extent, thereby allowing the desiccant wheel 220 to remove more moisture from the supply air stream 201 via adsorption or absorption, depending on the nature of the desiccant utilized. Through the use of active regeneration of the desiccant wheel 220, systems embodying principles of the present invention can achieve supply air dew points at or below approximately 40° F.

Figure 2B:
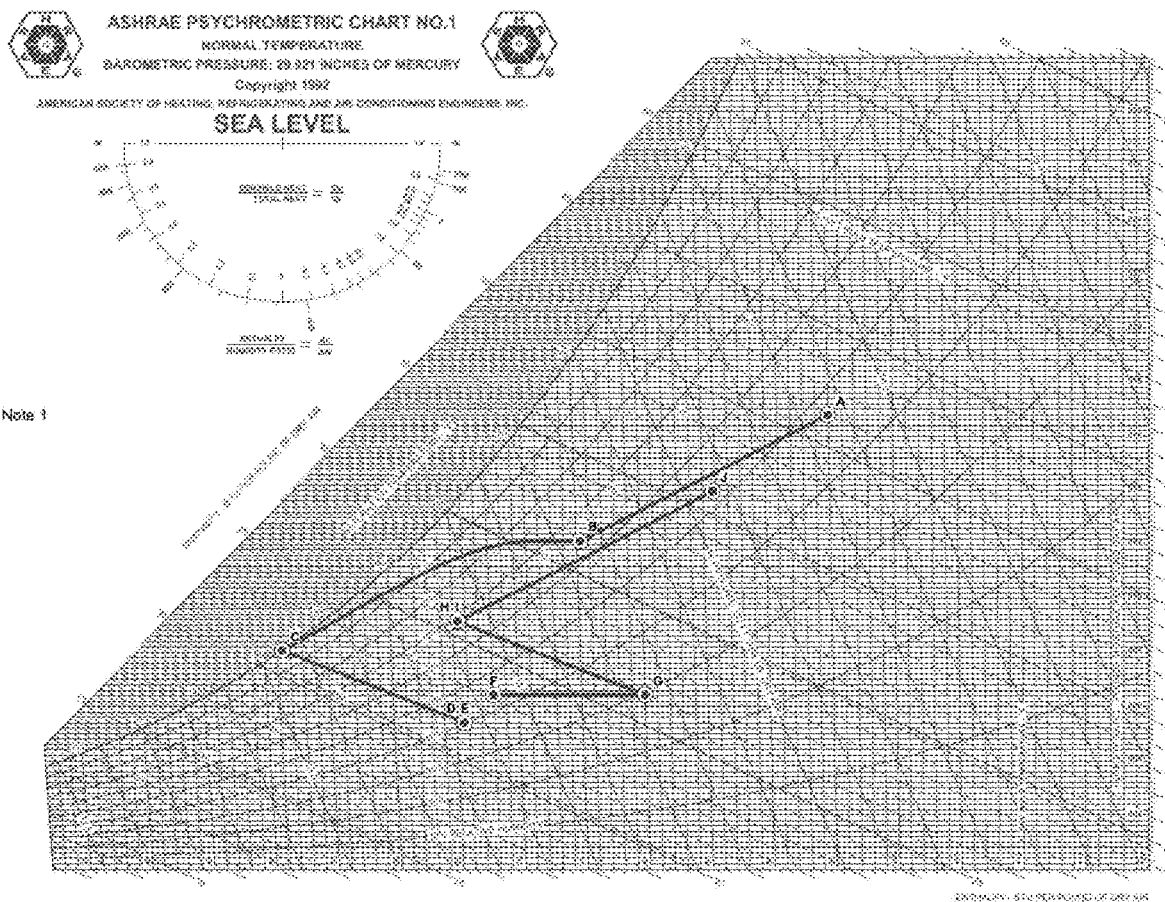
FIG. 2B is a psychrometric chart showing the performance of the dual-wheel energy recovery system depicted in FIG. 2A at a dry bulb temperature of 95° F.
Figure 2C:
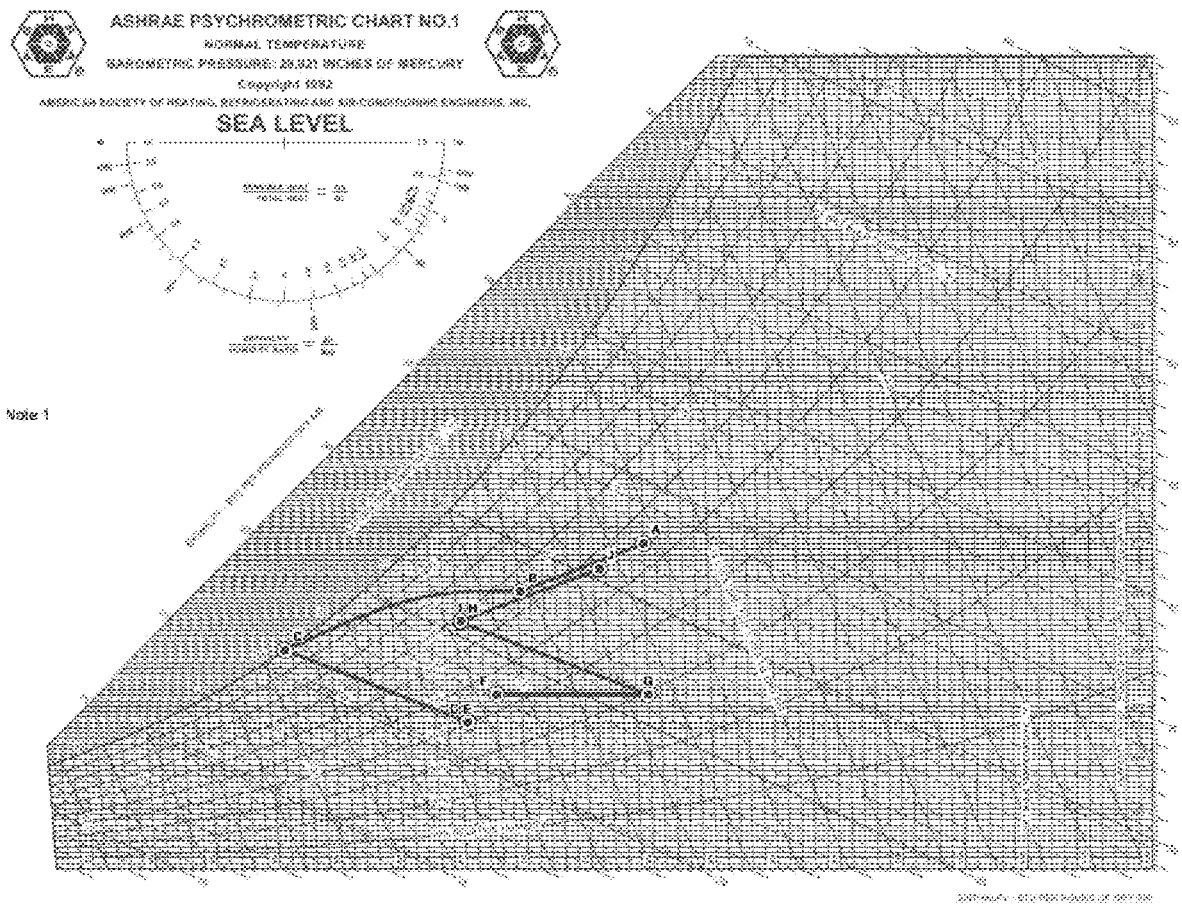
FIG. 2C is a psychrometric chart showing the performance of the dual-wheel energy recovery system depicted in FIG. 2A at a dry bulb temperature of 80° F.
Figure 2D:
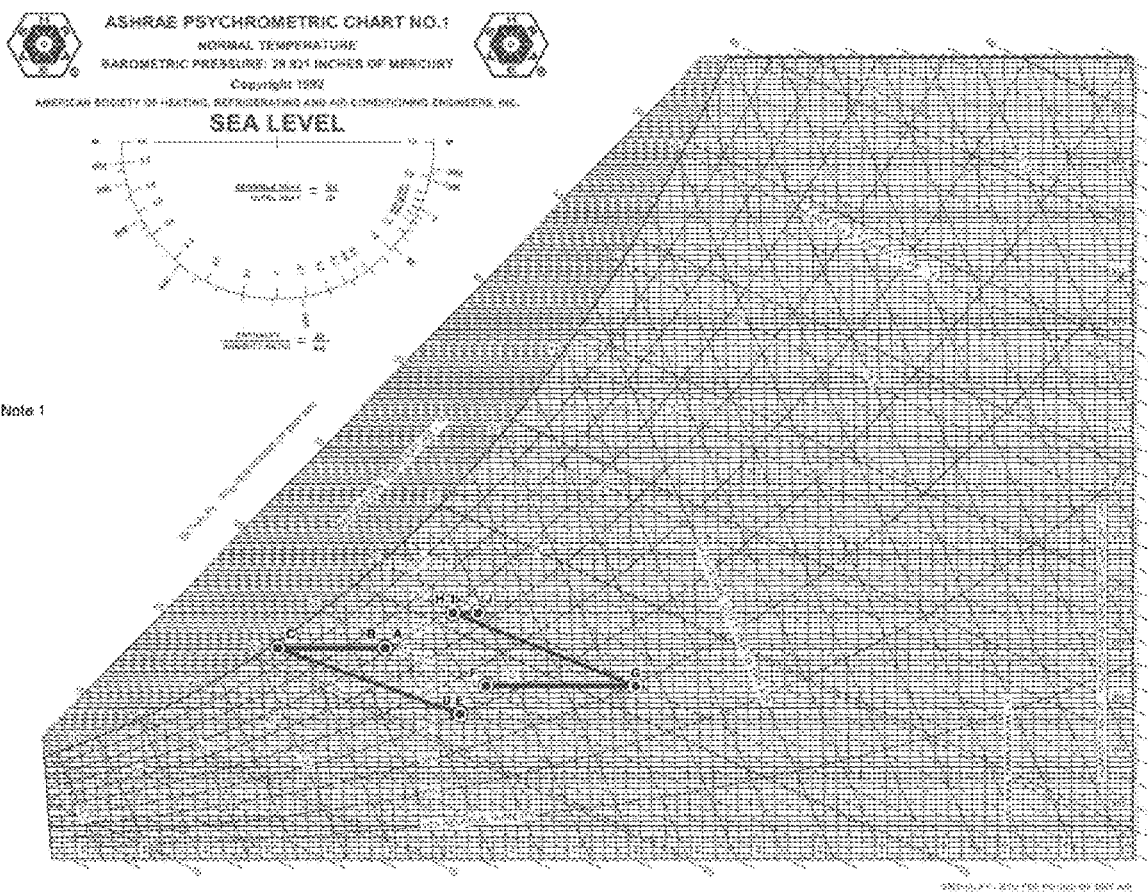
FIG. 2D is a psychrometric chart showing the performance of the dual-wheel energy recovery system depicted in FIG. 2A at a dry bulb temperature of 60° F.

Referring to the psychometric charts depicted in FIGS. 2B-2D, examples of the performance of the dehumidification system depicted in FIG. 2A is shown. In this example, the system 200 is utilizing a Novelaire Model No. ECW786 energy recovery wheel 210 rotating at 35 revolutions per minute, a Novelaire Model No. DES786 desiccant wheel 220 rotating at 8 revolutions per hour, a 15 HP supply air fan 250a, and a 15 HP return air fan 250b.

Referring to FIG. 2B, summer operations are presumed with a 95° F. outdoor temperature. A supply air stream 201 having a dry-bulb temperature of 95.0° F. and moisture contents of 117.6 grains/lb (Point A) is drawn into the supply air passageway 275 by the supply air fan 250a. The supply air stream 201 is cooled to 75.3° F. and dehumidified to 84.7 grains/lb (Point B) as the air passes through the process side of the energy recovery wheel 210. Next, the supply air stream 201 passes through the chilled water coil 230 where it is cooled beyond its dew point (62.5° F.) to remove moisture via condensation. Leaving the cooling coil 230, the supply air stream 201 is at 51.4° F., 100.0% relative humidity, and a moisture content of to 56.7 grains/lb (Point C). Next, the supply air stream 201 is heated and further dehumidified as it passes through the process side of the desiccant wheel 220. The supply air 201 entering the conditioned space exhibits a dry bulb temperature of 65.6° F., 52.4% relative humidity, and a moisture content of to 37.8 grains/lb (Point D). Meanwhile, a return air stream 202 having a dry-bulb temperature of 68.0° F. and moisture contents of 44.8 grains/lb (Point F) is drawn into the return air passageway 285 by the return air fan 250b. The return air stream 202 is passed through the heating coil 240 where it is warmed. Leaving the heating coil 240, the supply air stream 201 is at 80.0° F., 29.5% relative humidity, and a moisture content of to 44.8 grains/lb (Point G). The return air stream 202 is then passed through the regeneration side of the desiccant wheel 220 in order to regenerate the desiccant wheel by absorbing moisture. Leaving the regeneration side of the desiccant wheel 220, the return air stream 202 is at 65.4° F., 68.0% relative humidity, and a moisture content of to 63.7 grains/lb (Point H). Lastly, the return air stream 202 is passed through the regeneration side of the energy recovery wheel 210, absorbing both sensible and latent energy from the wheel 210. The return air stream 202 is exhausted from the system 200 at 85.5° F., 53.0% relative humidity, and a moisture content of 98.0 grains/lb (Point J). Under these parameters, the power consumption of the system 200 is 44.3 kW, the cooling effect is 887,532 Btu/hr, the total moisture extraction is 512.4 lb/hr, and the operating cost is $0.011/lb of water removed.

Additional computer simulations were ran to evaluate the performance of the system 200 at presumed outdoor temperatures of 80° F. (see FIG. 2C) and 60° F. (see FIG. 2D). With a presumed 80° F. outdoor temperature, the power consumption of the system 200 is 34.6 kW, the cooling effect is 483,706 Btu/hr, the total moisture extraction is 297.0 lb/hr, and the operating cost is $0.016/lb of water removed. With a presumed 60° F. outdoor temperature, the power consumption of the system 200 is 20.3 kW, the cooling effect is 59,607 Btu/hr, the total moisture extraction is 110.6 lb/hr, and the operating cost is $0.030/lb of water removed.

Example 3

In the embodiment of the present invention depicted in FIG. 3A, an improved dual-wheel HVAC system using active desiccant wheel regeneration is disclosed. While the actively regenerated, dual-wheel HVAC system disclosed in FIG. 2A is capable of providing supply air having lower dew points than conventional dual-wheel HVAC systems, a downside of the system 200 disclosed in FIG. 2A is that the operating cost of the overall system is increased due to: i) the cost of the heating means generating heat, whether it is a hot water coil or a condenser coil from a DX system; and ii) the increased cooling load placed on the cooling means. The embodiment of the present invention depicted in FIG. 3A aims to reduce these shortcomings by dividing the regeneration side of the desiccant wheel assembly 320 into two sections. Referring to the embodiment depicted in FIG. 3A, an untreated portion of the return air stream 302 will partially regenerate the desiccant wheel 320 in a first regen section of the desiccant wheel assembly 320 and then be transmitted through the energy recovery wheel 310 for energy recovery before being exhausted. Meanwhile, in the second regen section of the desiccant wheel assembly 320, a preheated portion of the return air stream 303 will be passed through the desiccant wheel to further enhance the regeneration of the desiccant wheel. Following regeneration of the desiccant wheel 320, the preheated return air stream 303 is exhausted. Through the use of active regeneration of the desiccant wheel, the system depicted in FIG. 3A can achieve supply air dew points at or below approximately 40° F. while using 8-12% less energy compared to the system 200 depicted in FIG. 2A without substantially increasing the unit cost. In addition, the system 300 depicted in FIG. 3 is capable of achieving dew points as low as 32° F., which is not possible with prior art dual-wheel energy recovery systems.

Referring to the psychometric charts depicted in FIGS. 3B-3D, examples of the performance of the dehumidification system depicted in FIG. 3A are shown. In this example, the system 300 is utilizing a Novelaire Model No. ECW786 energy recovery wheel 310 rotating at 35 revolutions per minute, a Novelaire Model No. DES786 desiccant wheel 320 rotating at 8 revolutions per hour, a 15 HP supply air fan 350a, a 7.5 HP return air fan 350b, and a 5 HP regen air fan 350c.

Referring to FIG. 3B, summer operations are presumed with a 95° F. outdoor temperature. A supply air stream 301 having a dry-bulb temperature of 95.0° F. and moisture contents of 117.6 grains/lb (Point A) is drawn into the supply air passageway 375 by the supply air fan 350a. The supply air stream 301 is cooled to 73.0° F. and dehumidified to 81.2 grains/lb (Point B) as the air passes through the process side of the energy recovery wheel 310. Next, the supply air stream 301 passes through the cooling coil 330 where it is cooled beyond its dew point (61.3° F.) to remove moisture via condensation. Leaving the cooling coil 330, the supply air stream 301 is at 52.4° F., 98.7% relative humidity, and a moisture content of to 58.1 grains/lb (Point C). Next, the supply air stream 301 is heated and further dehumidified as it passes through the process side of the desiccant wheel 320. The supply air 301 entering the conditioned space exhibits a dry bulb temperature of 67.2° F., 38.3% relative humidity, and a moisture content of to 37.8 grains/lb (Point D). Meanwhile, return air having a dry-bulb temperature of 68.0° F. and moisture contents of 44.8 grains/lb (Point F) is drawn into the return air passageway 385 by the return air fan 350b and into the regen passageway 395 by the regen air fan 350c. The first return air stream 302 is passed through the first regen section of the desiccant wheel 320, while the second return air stream 303 is first passed through the heating coil 340 before being passed through the second regen section of the desiccant wheel 320 and then being exhausted. Leaving the regeneration side of the desiccant wheel 320, the first return air stream 302 is at 59.8° F., 73.4% relative humidity, and a moisture content of to 56.0 grains/lb (Point I), while the second return air stream 303 is exhausted from the system 300 at 75.4° F., 67.7% relative humidity, and a moisture content of to 89.6 grains/lb (Point H). Lastly, the first return air stream 302 is passed through the regeneration side of the energy recovery wheel 310, absorbing both sensible and latent energy from the wheel 310. The first return air stream 302 is exhausted from the system 300 at 89.0° F., 50.8% relative humidity, and a moisture content of 105 grains/lb (Point J). Under these parameters, the power consumption of the system 300 is 50.6 kW, the cooling effect is 869,123 Btu/hr, the total moisture extraction is 512.0 lb/hr, and the operating cost is $0.0099/lb of water removed.

Additional computer simulations were ran to evaluate the performance of the system 300 at presumed outdoor temperatures of 80° F. (see FIG. 3C) and 60° F. (see FIG. 3D). With a presumed 80° F. outdoor temperature, the power consumption of the system 300 is 40.1 kW, the cooling effect is 465,318 Btu/hr, the total moisture extraction is 296.7 lb/hr, and the operating cost is $0.0135/lb of water removed. With a presumed 60° F. outdoor temperature, the power consumption of the system 300 is 30.3 kW, the cooling effect is 66,604 Btu/hr, the total moisture extraction is 121.5 lb/hr, and the operating cost is $0.0250/lb of water removed.

Example 4

In the embodiment of the present invention depicted in FIG. 6A, the system 500 differs from system 300 depicted in FIGS. 3A and 4 in that the third passageway 595 is fluidly connected to the second passageway 585 downstream from the regeneration side of the desiccant wheel 520 but upstream of the regeneration side of the energy recovery wheel 510, thereby allowing a mixture of the first and second return air streams 502, 503 to be transmitted through the regeneration side of the energy recovery wheel 510. This embodiment is particularly advantageous during summer operations where the second return air stream 503 has a lower enthalpy leaving the regeneration side of the desiccant wheel 520 than the outside air.

Figure 6B:
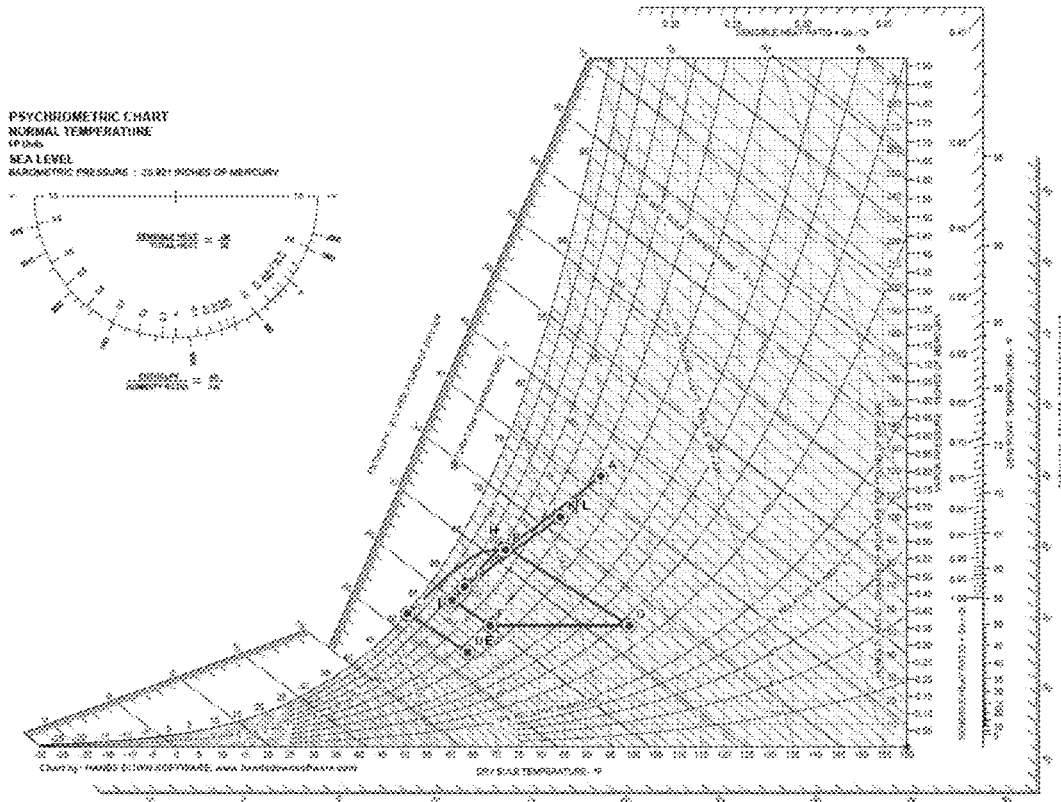
FIG. 6B is a psychrometric chart showing the performance of the dual-wheel energy recovery system depicted in FIG. 6A at a dry bulb temperature of 95° F.

Referring to the psychometric charts depicted in FIG. 6B, examples of the performance of the dehumidification system depicted in FIG. 6A are shown. In this example, the system 500 is utilizing a Novelaire Model No. ECW786 energy recovery wheel 510 rotating at 35 revolutions per minute, a Novelaire Model No. DES786 desiccant wheel 520 rotating at 8 revolutions per hour, a 15 HP supply air fan 550a, and a 15 HP supply air fan 550b.

Referring to FIG. 6B, summer operations are presumed with a 95° F. outdoor temperature. A supply air stream 501 having a dry-bulb temperature of 95.0° F. and moisture contents of 118.0 grains/lb (Point A) is drawn into the supply air passageway 575 by the supply air fan 550a. The supply air stream 501 is cooled to 74.0° F. and dehumidified to 85.8 grains/lb (Point B) as the air passes through the process side of the energy recovery wheel 510. Next, the supply air stream 501 passes through the cooling coil 530 where it is cooled beyond its dew point (62.8° F.) to remove moisture via condensation. Leaving the cooling coil 530, the supply air stream 501 is at 52.4° F., 99.0% relative humidity, and a moisture content of to 58.1 grains/lb (Point C). Next, the supply air stream 501 is heated and further dehumidified as it passes through the process side of the desiccant wheel 520. The supply air 501 entering the conditioned space exhibits a dry bulb temperature of 64.9° F., 45.0% relative humidity, and a moisture content of to 41.2 grains/lb (Point D). Meanwhile, return air having a dry-bulb temperature of 70.0° F. and moisture contents of 52.9 grains/lb (Point F) is drawn into the return air passageway 585 and into the regen passageway 595 by the return air fan 550b. The first return air stream 502 is passed through the first regen section of the desiccant wheel 520, while the second return air stream 503 is first passed through the heating coil 540 before being passed through the second regen section of the desiccant wheel 520. Leaving the regeneration side of the desiccant wheel 520, the first return air stream 502 is at 62.1° F., 76.6% relative humidity, and a moisture content of to 63.8 grains/lb (Point I), while the second return air stream 503 is at 73.4° F., 71.0% relative humidity, and a moisture content of to 87.8 grains/lb (Point H). Next, the first return air stream 502 and the second return air stream 503 are mixed in the first return passageway 585 (Point J). The mixed return air stream 504 (64.9° F.; 75.7% relative humidity) is then passed through the regeneration side of the energy recovery wheel 510, absorbing both sensible and latent energy from the wheel 510 (Point K). Lastly, the first return air stream 502 is exhausted from the system 500 (Point L,M).

Many modifications and other embodiments of the inventions set forth herein will come to mind to one skilled in the art to which these inventions pertain having the benefit of the teaching presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:
1. A HVAC system, comprising:
   (a) a plurality of air suppliers for creating a plurality of distinct air streams, the plurality of air suppliers comprising: a first air supplier for creating a first air stream; and a second air supplier for creating a second air stream and a third air stream;
   (b) a cooling means positioned within the first air stream;
   (c) a heating means positioned within the third air stream;
   (d) an energy recovery wheel defining a regeneration side and a process side, wherein the process side is positioned in the first air stream at a position upstream of the cooling means, and wherein the regeneration side is positioned in the second air stream;
   (e) a desiccant wheel defining a regeneration side and a process side, wherein the process side is positioned in the first air stream at a position downstream of the cooling means, and wherein the regeneration side is positioned partially within the second air stream and partially within the third air stream at a position downstream of the heating means.

2. The HVAC system of claim 1, wherein the heating means is an indirect heating heat exchanger.

3. The HVAC system of claim 1, wherein the cooling means is an indirect cooling heat exchanger.

4. The HVAC system of claim 1, wherein the heating means is an indirect heat exchanger comprising a hot water coil, and wherein the cooling means is an indirect cooling heat exchanger comprising a chilled water coil.

5. The HVAC system of claim 1, wherein the heating means is a condenser and the cooling means is a direct-expansion evaporator coil.

6. The HVAC system of claim 1, further comprising an enclosure having a supply air passageway and a first return air passageway, and a second return air passageway, wherein the first air stream is transmitted through the supply air passageway, the second air stream is transmitted through the first return air passageway, and the third air stream is transmitted through the second return air passageway.

7. The HVAC system of claim 6, wherein the process side of the energy recovery wheel is positioned in the supply air passageway, and wherein the regeneration side of the energy recovery wheel is positioned in the first return air passageway.

8. The HVAC system of claim 7, wherein the process side of the desiccant wheel is positioned in the supply air passageway, and wherein the regeneration side of the desiccant wheel is positioned partially within the first return air passageway and partially within the second return air passageway.

9. The HVAC system of claim 8, wherein the desiccant wheel is configured to rotate in a first direction such that a section of the desiccant wheel cycles successively through the supply air passageway, the first return air passageway, and then the second return air passageway.

10. A dual-wheel HVAC system, comprising:
   (a) an enclosure comprising: i) a supply air passageway having a supply air inlet and supply air outlet; ii) a first return air passageway having a first return air inlet and a first return air outlet; and iii) a second return air passageway having a second return air inlet;
   (b) an energy recovery wheel defining a regeneration side and a process side, wherein the process side of the energy recovery wheel is positioned in the supply air passageway, and wherein the regeneration side of the energy recovery wheel is positioned in the first return air passageway;
   (c) a desiccant wheel defining a regeneration side and a process side, wherein the process side of the desiccant wheel is positioned in the supply air passageway, and wherein the regeneration side of the desiccant wheel is positioned partially within the first return air passageway and partially within the second return air passageway;
   (d) a cooling heat exchanger positioned within the supply air passageway between the process side of the energy recovery wheel and the process side of the desiccant wheel;
   (e) a heating heat exchanger positioned within the second return air passageway between the second return air inlet and the regeneration side of the desiccant wheel.

11. The dual-wheel HVAC system of claim 10, wherein the heating heat exchanger is a hot water coil, and wherein the cooling heat exchanger is a chilled water coil.

12. The dual-wheel HVAC system of claim 10, wherein the heating heat exchanger is a condenser, and wherein the cooling heat exchanger is a direct-expansion evaporator coil.

13. A method of providing air to an indoor space, comprising:
   (a) providing a supply air stream from an outdoor space;
   (b) passing a first portion of the supply air stream through a process side of an energy recovery wheel to produce a second portion of the supply stream;
   (c) cooling the second portion of the supply air stream to produce a third portion of the supply air stream, wherein an amount of the cooling is based on a desired characteristic associated with air provided to the indoor space;
   (d) passing the third portion of the supply air stream through a process side of a desiccant wheel to produce a fourth portion of the supply air stream;
   (e) providing the fourth portion of the supply air stream to an indoor space, wherein the fourth portion of the supply air stream is associated with the desired characteristic;
   (f) receiving a return air stream from the indoor space, wherein the return air stream is subdivided into a first return air stream and a second return air stream;
   (g) passing a first portion of the first return air stream through a first regeneration section of the desiccant wheel to produce a second portion of the first return air stream;
   (h) preheating a first portion of the second return air stream to produce a preheated second portion of the second return air stream;
   (i) passing the second portion of the second return air stream through a second regeneration section of the desiccant wheel to produce a third portion of the second return air stream,
   (j) mixing at least a percentage of the third portion of the second return air stream with the second portion of the first return air stream to form a first portion of a mixed return air stream;
   (k) passing the first portion of the mixed return air stream through a regeneration side of the energy recovery wheel to produce a second portion of the mixed return air stream; and
   (l) exhausting the second portion of the mixed return air stream into the outdoor space.

* * * * *